(12) United States Patent  
Tokimasa et al.

(10) Patent No.: US 9,180,862 B2  
(45) Date of Patent: *Nov. 10, 2015

(54) VEHICLE DYNAMIC CONTROL APPARATUS AND VEHICLE DYNAMIC CONTROL SYSTEM USING THE SAME

(75) Inventors: Mitsuhiro Tokimasa, Obu (JP); Junpei Tatsukawa, Chiryu (JP); Yasuhiko Mukai, Anjo (JP); Masaki Maruyama, Nagoya (JP); Masatoshi Hanzawa, Kariya (JP); Hirofumi Nitta, Obu (JP); Yuichi Mizutani, Aichi-ken (JP)

(73) Assignees: DENSO CORPORATION, Kariya, Aichi-pref. (JP); ADVICS CO., LTD., Kariya, Aichi-pref. (JP); AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 283 days.

This patent is subject to a terminal disclaimer.

(21) Appl. No.: 13/282,601

(22) Filed: Oct. 27, 2011

(65) Prior Publication Data

US 2012/0109411 A1 May 3, 2012

(30) Foreign Application Priority Data

Oct. 29, 2010 (JP) ................................. 2010-244536

(51) Int. Cl.
*B60W 10/00* (2006.01)
*B60W 30/02* (2012.01)
(Continued)

(52) U.S. Cl.
CPC ............. *B60W 10/184* (2013.01); *B60W 10/20* (2013.01); *B60W 30/09* (2013.01); *B60W 2050/009* (2013.01); *B60W 2720/14* (2013.01)

(58) Field of Classification Search
CPC ........ B60K 6/48; B60W 10/02; B60W 10/06; B60W 10/08; B60W 20/00
USPC ............... 701/1, 2, 22, 36, 41, 70, 79, 83, 96, 701/110, 115, 121, 29.1, 29.2, 29.7–34.4
See application file for complete search history.

(56) References Cited

U.S. PATENT DOCUMENTS 7,162,333 B2 1/2007 Koibuchi et al.
2002/0026270 A1 2/2002 Kurishige et al.
(Continued)

FOREIGN PATENT DOCUMENTS

JP 63-182709 7/1988
JP 63-271540 11/1988
(Continued)

OTHER PUBLICATIONS

Office Action issued Mar. 11, 2013 in co-pending U.S. Appl. No. 13/282,626.

(Continued)

*Primary Examiner* — Helal A Algahaim
*Assistant Examiner* — Charles J Han
(74) *Attorney, Agent, or Firm* — Harness, Dickey & Pierce, P.L.C.

(57) ABSTRACT

A vehicle dynamic control apparatus is designed to control a plurality of controlled objects based on a first parameter associated with a motion of a vehicle in a same direction to fulfill a request value of a second parameter associated with the motion of the vehicle in the same direction and outputted from a control requester. The vehicle dynamic control apparatus includes an availability obtainer configured to obtain an availability of the first parameter of each of the controlled objects, and to output the availability of the first parameter of each of the controlled objects to the control requester.

16 Claims, 18 Drawing Sheets

(51) Int. Cl.
  *B60W 10/184* (2012.01)
  *B60W 10/20* (2006.01)
  *B60W 30/09* (2012.01)
  *B60W 40/114* (2012.01)
  *B60W 50/00* (2006.01)

(56) References Cited

U.S. PATENT DOCUMENTS

| | | | |
|---|---|---|---|
| 2002/0143451 A1* | 10/2002 | Hac et al. | 701/48 |
| 2004/0083043 A1 | 4/2004 | Akiyama et al. | |
| 2004/0128044 A1 | 7/2004 | Hac | |
| 2005/0027402 A1 | 2/2005 | Koibuchi et al. | |
| 2005/0154506 A1 | 7/2005 | Takamatsu | |
| 2005/0171669 A1 | 8/2005 | Sato | |
| 2005/0203646 A1 | 9/2005 | Makino et al. | |
| 2006/0208564 A1 | 9/2006 | Yuda et al. | |
| 2007/0004553 A1* | 1/2007 | Oikawa et al. | 477/97 |
| 2007/0083315 A1 | 4/2007 | Takamatsu et al. | |
| 2007/0088484 A1 | 4/2007 | Fujita | |
| 2007/0112483 A1 | 5/2007 | Jeong | |
| 2007/0138986 A1 | 6/2007 | Kutsuna et al. | |
| 2010/0241289 A1* | 9/2010 | Sandberg | 701/2 |
| 2011/0144885 A1 | 6/2011 | Ohtsuka et al. | |
| 2011/0307152 A1* | 12/2011 | Shono et al. | 701/54 |
| 2012/0109414 A1 | 5/2012 | Kumabe et al. | |
| 2012/0109460 A1 | 5/2012 | Tokimasa et al. | |

FOREIGN PATENT DOCUMENTS

| | | |
|---|---|---|
| JP | 06-032242 | 2/1994 |
| JP | 11-031011 | 2/1999 |
| JP | 2003-159966 | 6/2003 |
| JP | 2003-191774 | 7/2003 |
| JP | 2005-161997 | 6/2005 |
| JP | 2005-180344 | 7/2005 |
| JP | 2005-193811 | 7/2005 |
| JP | 2005-219541 | 8/2005 |
| JP | 2005-255037 | 9/2005 |
| JP | 2009-068402 | 4/2009 |
| JP | 4297150 | 4/2009 |
| JP | 2009-137582 | 6/2009 |
| JP | 4455379 | 2/2010 |
| JP | 2010-053705 | 3/2010 |
| JP | 2010-115959 | 5/2010 |
| WO | WO 2010/089848 | 8/2010 |

OTHER PUBLICATIONS

Office Action dated Mar. 18, 2014 in corresponding Japanese Application No. 2010-244534.

Office Action dated Mar. 18, 2014 in corresponding Japanese Application No. 2010-244535.

Office Action dated Mar. 18, 2014 in corresponding Japanese Application No. 2010-244537.

Office Action dated Mar. 19, 2014 in corresponding Chinese Application No. 201110354280.2.

Office Action dated Mar. 25, 2014 in corresponding Japanese Application No. 2010-244536.

Office Action issued Feb. 25, 2014 in co-pending U.S. Appl. No. 13/282,626.

* cited by examiner

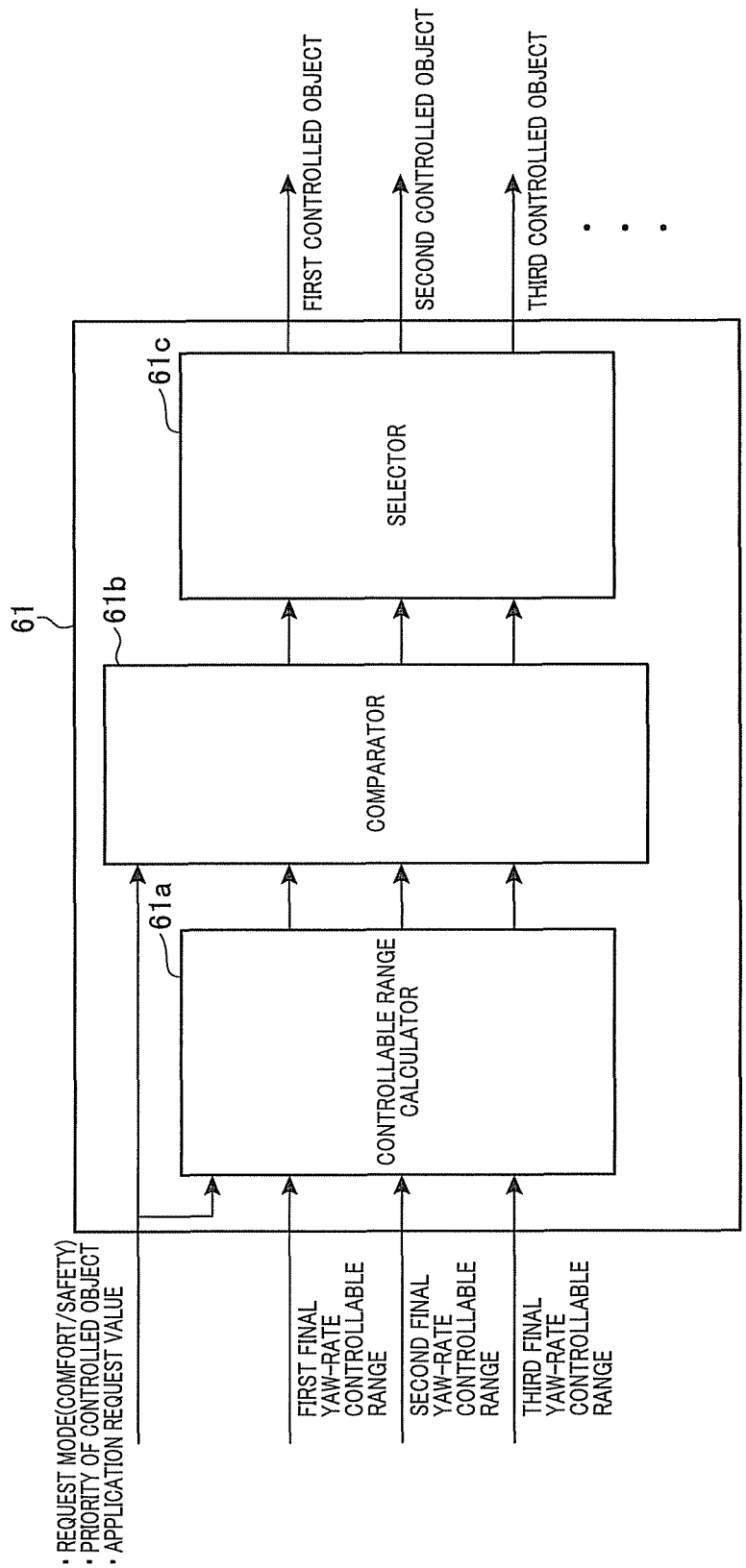

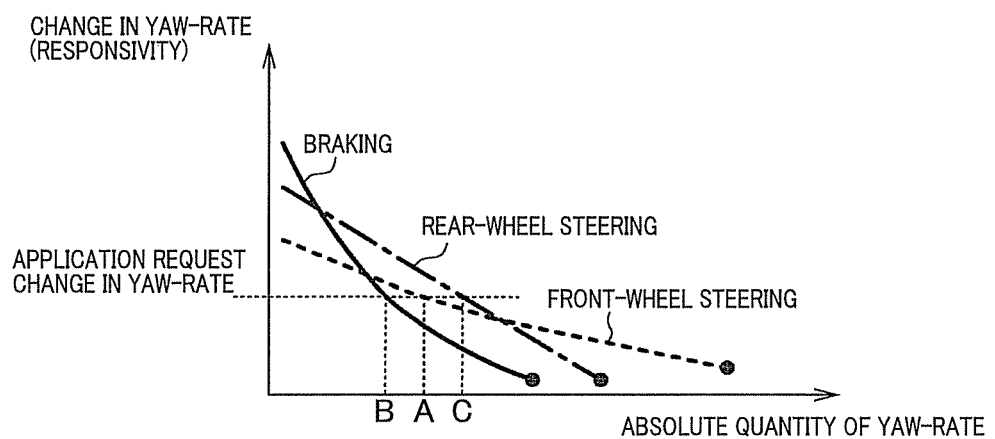
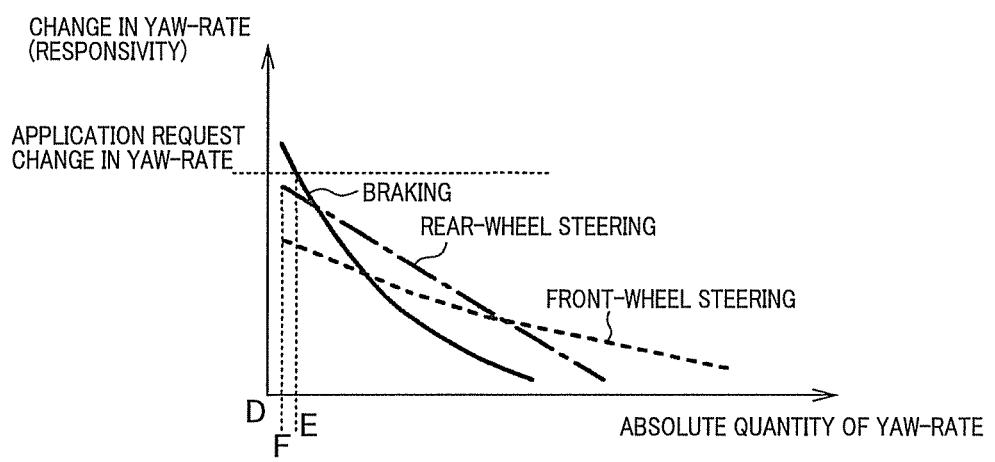

APPLICATION REQUEST MODE : COMFORT

APPLICATION REQUEST MODE : SAFETY

FIG. 7A

| SELECTION OF FIRST CONTROLLED OBJECT | APPLICATION-REQUEST YAW-RATE | | | | | | | |
|---|---|---|---|---|---|---|---|---|
| | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 7: ALL FULFILLMENT | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 6: REAR WHEEL STEERING OR BRAKING | 4: SELECTION OF MAXIMUM CHANGE | 7: FRONT-WHEEL STEERING OR REAR-WHEEL STEERING WITH HIGHER VALUE | 6: BRAKING OR REAR-WHEEL STEERING WITH HIGHER VALUE | 5: FRONT-WHEEL STEERING OR BRAKING WITH HIGHER VALUE | 3: REAR-WHEEL STEERING | 2: BRAKING | 1: FRONT-WHEEL STEERING | 8: FRONT OR REAR WHEEL STEERING OR BRAKING WITH HIGHER VALUE |
| 5: REAR WHEEL STEERING OR FRONT WHEEL STEERING | 4: SELECTION OF MAXIMUM CHANGE | 4: SELECTION OF MAXIMUM CHANGE | 3: REAR-WHEEL STEERING | 2: BRAKING | 3: REAR-WHEEL STEERING | 2: BRAKING | 1: FRONT-WHEEL STEERING | 7: BRAKING OR REAR-WHEEL STEERING WITH HIGHER VALUE |
| 3: FRONT WHEEL STEERING OR BRAKING | 4: SELECTION OF MAXIMUM CHANGE | 4: SELECTION OF MAXIMUM CHANGE | 4: SELECTION OF MAXIMUM CHANGE | 1: FRONT-WHEEL STEERING | 4: SELECTION OF MAXIMUM CHANGE | 2: BRAKING | 1: FRONT-WHEEL STEERING | 6: FRONT OR REAR WHEEL STEERING WITH HIGHER VALUE |
| 4: REAR-WHEEL STEERING | 4: SELECTION OF MAXIMUM CHANGE | 3: REAR-WHEEL STEERING | 1: FRONT-WHEEL STEERING | 3: REAR-WHEEL STEERING | 3: REAR-WHEEL STEERING | 2: BRAKING | 1: FRONT-WHEEL STEERING | 5: REAR WHEEL STEERING OR FRONT WHEEL STEERING |
| 2: BRAKING | 3: REAR-WHEEL STEERING | 2: BRAKING | 3: REAR-WHEEL STEERING | 2: BRAKING | 2: BRAKING | 2: BRAKING | 1: FRONT-WHEEL STEERING | 3: REAR-WHEEL STEERING |
| 1: FRONT-WHEEL STEERING | 2: BRAKING | 1: FRONT-WHEEL STEERING | 2: BRAKING | 1: FRONT-WHEEL STEERING | 1: FRONT-WHEEL STEERING | 1: FRONT-WHEEL STEERING | 1: FRONT-WHEEL STEERING | 2: BRAKING |
| 0: ALL UNFULFILLMENT | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE | 4: SELECTION OF MAXIMUM CHANGE |

(Left axis: APPLICATION-REQUEST CHANGE IN YAW-RATE)

FIG.7B

| SELECTION OF SECOND CONTROLLED OBJECT \ APPLICATION-REQUEST YAW-RATE | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
|---|---|---|---|---|---|---|---|---|
| 7: ALL FULFILLMENT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 0: ALL UNFULFILLMENT |
| 6: REAR WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 6: SELECTION OF MAXIMUM VALUE EXCEPT FOR FIRST |
| 5: REAR WHEEL STEERING OR FRONT WHEEL STEERING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 1: FRONT-WHEEL STEERING | 6: SELECTION OF MAXIMUM VALUE EXCEPT FOR FIRST |
| 3: FRONT WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | 3: REAR-WHEEL STEERING | NO SECOND CONTROLLED OBJECT | NO SECOND CONTROLLED OBJECT | 6: SELECTION OF MAXIMUM VALUE EXCEPT FOR FIRST |
| 4: REAR-WHEEL STEERING | NO SECOND CONTROLLED OBJECT | NO SECOND CONTROLLED OBJECT | 5: SELECTION OF MAXIMUM VALUE | 5: SELECTION OF MAXIMUM VALUE | NO SECOND CONTROLLED OBJECT | NO SECOND CONTROLLED OBJECT | 1: FRONT-WHEEL STEERING | 5: SELECTION OF MAXIMUM VALUE |
| 2: BRAKING | NO SECOND CONTROLLED OBJECT | NO SECOND CONTROLLED OBJECT | 5: SELECTION OF MAXIMUM VALUE | NO SECOND CONTROLLED OBJECT | 3: REAR-WHEEL STEERING | NO SECOND CONTROLLED OBJECT | 1: FRONT-WHEEL STEERING | 5: SELECTION OF MAXIMUM VALUE |
| 1: FRONT-WHEEL STEERING | NO SECOND CONTROLLED OBJECT | NO SECOND CONTROLLED OBJECT | NO SECOND CONTROLLED OBJECT | NO SECOND CONTROLLED OBJECT | 3: REAR-WHEEL STEERING | 2: BRAKING | NO SECOND CONTROLLED OBJECT | 5: SELECTION OF MAXIMUM VALUE |
| 0: ALL UNFULFILLMENT | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE | 4: SELECTION OF SECOND CHANGE |

APPLICATION-REQUEST CHANGE IN YAW-RATE

FIG. 7C

| SELECTION OF THIRD CONTROLLED OBJECT \ APPLICATION-REQUEST YAW-RATE | 7: ALL FULFILLMENT | 6: REAR WHEEL STEERING OR BRAKING | 5: REAR WHEEL STEERING OR FRONT WHEEL STEERING | 4: REAR-WHEEL STEERING | 3: FRONT WHEEL STEERING OR BRAKING | 2: BRAKING | 1: FRONT-WHEEL STEERING | 0: ALL UNFULFILLMENT |
|---|---|---|---|---|---|---|---|---|
| 7: ALL FULFILLMENT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR YAW-RATE |
| 6: REAR WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR YAW-RATE |
| 5: REAR WHEEL STEERING OR FRONT WHEEL STEERING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR YAW-RATE |
| 3: FRONT WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR YAW-RATE |
| 4: REAR-WHEEL STEERING | NO SECOND CONTROLLED OBJECT | NO SECOND CONTROLLED OBJECT | NO SECOND CONTROLLED OBJECT | NO THIRD CONTROLLED OBJECT | NO THIRD CONTROLLED OBJECT | NO THIRD CONTROLLED OBJECT | NO THIRD CONTROLLED OBJECT | THIRD CONTROLLED OBJECT FOR YAW-RATE |
| 2: BRAKING | NO SECOND CONTROLLED OBJECT | NO THIRD CONTROLLED OBJECT | NO THIRD CONTROLLED OBJECT | NO THIRD CONTROLLED OBJECT | NO THIRD CONTROLLED OBJECT | NO THIRD CONTROLLED OBJECT | NO THIRD CONTROLLED OBJECT | THIRD CONTROLLED OBJECT FOR YAW-RATE |
| 1: FRONT-WHEEL STEERING | NO SECOND CONTROLLED OBJECT | NO THIRD CONTROLLED OBJECT | NO THIRD CONTROLLED OBJECT | NO THIRD CONTROLLED OBJECT | NO THIRD CONTROLLED OBJECT | NO THIRD CONTROLLED OBJECT | NO THIRD CONTROLLED OBJECT | THIRD CONTROLLED OBJECT FOR YAW-RATE |
| 0: ALL UNFULFILLMENT | THIRD CONTROLLED OBJECT FOR CHANGE IN YAW-RATE | THIRD CONTROLLED OBJECT FOR CHANGE IN YAW-RATE | THIRD CONTROLLED OBJECT FOR CHANGE IN YAW-RATE | THIRD CONTROLLED OBJECT FOR CHANGE IN YAW-RATE | THIRD CONTROLLED OBJECT FOR CHANGE IN YAW-RATE | THIRD CONTROLLED OBJECT FOR CHANGE IN YAW-RATE | THIRD CONTROLLED OBJECT FOR CHANGE IN YAW-RATE | THIRD CONTROLLED OBJECT FOR CHANGE IN YAW-RATE |

(Row labels on left indicate APPLICATION-REQUEST CHANGE IN YAW-RATE selection of third controlled object.)

FIG.8A

| SELECTION OF FIRST CONTROLLED OBJECT | APPLICATION-REQUEST YAW-RATE | | | | | | | |
|---|---|---|---|---|---|---|---|---|
| | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 7: ALL FULFILLMENT | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 6: REAR WHEEL STEERING OR BRAKING | 4: SELECTION OF MAXIMUM VALUE | 6: REAR WHEEL STEERING OR BRAKING | 7: FRONT-WHEEL STEERING OR REAR-WHEEL STEERING WITH HIGHER CHANGE | 6: BRAKING OR REAR-WHEEL STEERING WITH HIGHER CHANGE | 3: REAR-WHEEL STEERING | 2: BRAKING | 1: FRONT-WHEEL STEERING | 8: FRONT OR REAR WHEEL STEERING OR BRAKING WITH HIGHER VALUE |
| 5: REAR WHEEL STEERING OR FRONT WHEEL STEERING | 4: SELECTION OF MAXIMUM VALUE | 4: SELECTION OF MAXIMUM CHANGE | 5: REAR WHEEL STEERING OR FRONT WHEEL STEERING | 4: SELECTION OF MAXIMUM VALUE | 3: REAR-WHEEL STEERING | 2: BRAKING | 1: FRONT-WHEEL STEERING | 7: BRAKING OR REAR-WHEEL STEERING WITH HIGHER CHANGE |
| 3: FRONT WHEEL STEERING OR BRAKING | 4: SELECTION OF MAXIMUM VALUE | 3: REAR-WHEEL STEERING | 4: SELECTION OF MAXIMUM VALUE | 3: FRONT WHEEL STEERING OR BRAKING | 2: BRAKING | 2: BRAKING | 1: FRONT-WHEEL STEERING | 6: FRONT OR REAR WHEEL STEERING WITH HIGHER CHANGE |
| 4: REAR-WHEEL STEERING | 4: SELECTION OF MAXIMUM VALUE | 3: REAR-WHEEL STEERING | 1: FRONT-WHEEL STEERING | 4: SELECTION OF MAXIMUM VALUE | 4: REAR-WHEEL STEERING | 4: SELECTION OF MAXIMUM VALUE | 1: FRONT-WHEEL STEERING | 5: REAR WHEEL STEERING OR FRONT WHEEL STEERING |
| 2: BRAKING | 3: REAR-WHEEL STEERING | 3: REAR-WHEEL STEERING | 3: REAR-WHEEL STEERING | 2: BRAKING | 3: REAR-WHEEL STEERING | 2: BRAKING | 2: BRAKING | 3: REAR-WHEEL STEERING |
| 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 1: FRONT-WHEEL STEERING | 2: BRAKING |
| 0: ALL UNFULFILLMENT | 4: SELECTION OF MAXIMUM CHANGE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE | 4: SELECTION OF MAXIMUM VALUE |

(Row axis: APPLICATION-REQUEST CHANGE IN YAW-RATE)

FIG.8B

| SELECTION OF SECOND CONTROLLED OBJECT | APPLICATION-REQUEST YAW-RATE | | | | | | | |
|---|---|---|---|---|---|---|---|---|
| | 7: ALL FULFILLMENT | 6: REAR WHEEL STEERING OR BRAKING | 5: REAR WHEEL STEERING OR FRONT WHEEL STEERING | 3: FRONT WHEEL STEERING OR BRAKING | 4: REAR-WHEEL STEERING | 2: BRAKING | 1: FRONT-WHEEL STEERING | 0: ALL UNFULFILLMENT |
| 7: ALL FULFILLMENT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 1: FRONT-WHEEL STEERING | 6: SELECTION OF MAXIMUM CHANGE EXCEPT FOR FIRST |
| 6: REAR WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 6: SELECTION OF MAXIMUM CHANGE EXCEPT FOR FIRST |
| 5: REAR WHEEL STEERING OR FRONT WHEEL STEERING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | 2: BRAKING | 1: FRONT-WHEEL STEERING | 6: SELECTION OF MAXIMUM CHANGE EXCEPT FOR FIRST |
| 3: FRONT WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | 3: REAR-WHEEL STEERING | NO SECOND CONTROLLED OBJECT | NO SECOND CONTROLLED OBJECT | 6: SELECTION OF MAXIMUM CHANGE EXCEPT FOR FIRST |
| 4: REAR-WHEEL STEERING | NO SECOND CONTROLLED OBJECT | NO SECOND CONTROLLED OBJECT | NO SECOND CONTROLLED OBJECT | 5: SELECTION OF MAXIMUM CHANGE | NO SECOND CONTROLLED OBJECT | 2: BRAKING | 1: FRONT-WHEEL STEERING | 5: SELECTION OF MAXIMUM VALUE |
| 2: BRAKING | NO SECOND CONTROLLED OBJECT | 5: SELECTION OF MAXIMUM CHANGE | 5: SELECTION OF MAXIMUM CHANGE | NO SECOND CONTROLLED OBJECT | 3: REAR-WHEEL STEERING | NO SECOND CONTROLLED OBJECT | 1: FRONT-WHEEL STEERING | 5: SELECTION OF MAXIMUM CHANGE |
| 1: FRONT-WHEEL STEERING | NO SECOND CONTROLLED OBJECT | NO SECOND CONTROLLED OBJECT | NO SECOND CONTROLLED OBJECT | NO SECOND CONTROLLED OBJECT | 3: REAR-WHEEL STEERING | 2: BRAKING | NO SECOND CONTROLLED OBJECT | 5: SELECTION OF MAXIMUM CHANGE |
| 0: ALL UNFULFILLMENT | 4: SELECTION OF SECOND VALUE | 4: SELECTION OF SECOND VALUE | 4: SELECTION OF SECOND VALUE | 4: SELECTION OF SECOND VALUE | 4: SELECTION OF SECOND VALUE | 4: SELECTION OF SECOND VALUE | 4: SELECTION OF SECOND VALUE | 4: SELECTION OF SECOND VALUE |

APPLICATION-REQUEST CHANGE IN YAW-RATE

FIG.8C

| SELECTION OF THIRD CONTROLLED OBJECT \ APPLICATION-REQUEST CHANGE IN YAW-RATE | APPLICATION-REQUEST YAW-RATE | | | | | | | | |
|---|---|---|---|---|---|---|---|---|---|
| | 7: ALL FULFILLMENT | 6: REAR WHEEL STEERING OR BRAKING | 5: REAR WHEEL STEERING OR FRONT WHEEL STEERING | 4: REAR-WHEEL STEERING | 3: FRONT WHEEL STEERING OR BRAKING | 2: BRAKING | 1: FRONT-WHEEL STEERING | 0: ALL UNFULFILLMENT |
| 7: ALL FULFILLMENT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR CHANGE IN YAW-RATE |
| 6: REAR WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR CHANGE IN YAW-RATE |
| 5: REAR WHEEL STEERING OR FRONT WHEEL STEERING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR CHANGE IN YAW-RATE |
| 3: FRONT WHEEL STEERING OR BRAKING | NO SECOND CONTROLLED OBJECT | NO SECOND CONTROLLED OBJECT | NO SECOND CONTROLLED OBJECT | NO SECOND CONTROLLED OBJECT | NO THIRD CONTROLLED OBJECT | NO THIRD CONTROLLED OBJECT | NO THIRD CONTROLLED OBJECT | THIRD CONTROLLED OBJECT FOR CHANGE IN YAW-RATE |
| 4: REAR-WHEEL STEERING | NO SECOND CONTROLLED OBJECT | NO SECOND CONTROLLED OBJECT | NO SECOND CONTROLLED OBJECT | NO THIRD CONTROLLED OBJECT | NO THIRD CONTROLLED OBJECT | NO THIRD CONTROLLED OBJECT | NO THIRD CONTROLLED OBJECT | THIRD CONTROLLED OBJECT FOR CHANGE IN YAW-RATE |
| 2: BRAKING | NO SECOND CONTROLLED OBJECT | NO THIRD CONTROLLED OBJECT | NO THIRD CONTROLLED OBJECT | NO THIRD CONTROLLED OBJECT | NO THIRD CONTROLLED OBJECT | NO THIRD CONTROLLED OBJECT | NO THIRD CONTROLLED OBJECT | THIRD CONTROLLED OBJECT FOR CHANGE IN YAW-RATE |
| 1: FRONT-WHEEL STEERING | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | NO SECOND CONTROLLED OBJECT | THIRD CONTROLLED OBJECT FOR CHANGE IN YAW-RATE |
| 0: ALL UNFULFILLMENT | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE | THIRD CONTROLLED OBJECT FOR YAW-RATE |

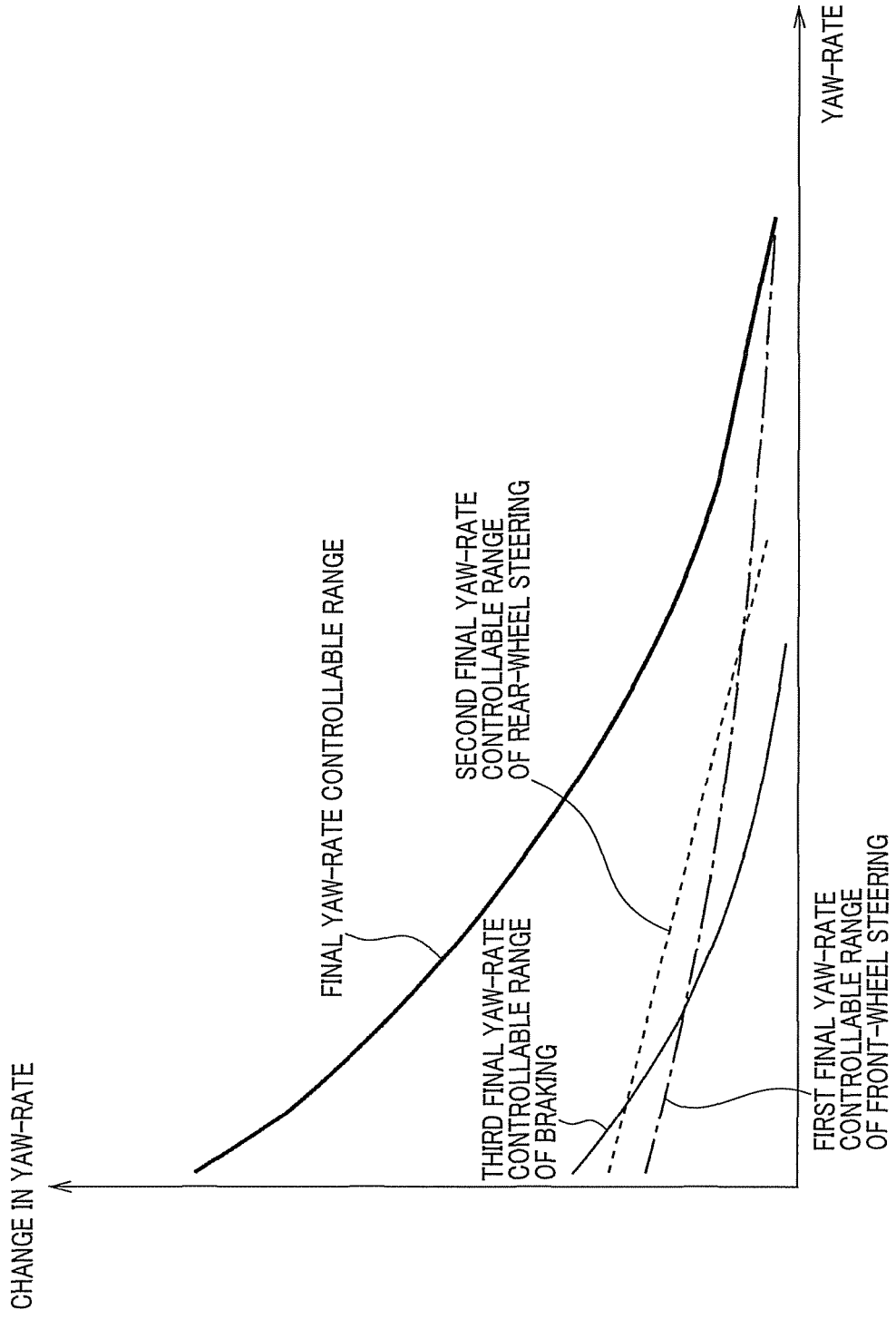

VEHICLE DYNAMIC CONTROL APPARATUS AND VEHICLE DYNAMIC CONTROL SYSTEM USING THE SAME

CROSS REFERENCE TO RELATED APPLICATIONS

This application is based on Japanese Patent Application 2010-244536 filed on Oct. 29, 2010. This application claims the benefit of priority from the Japanese Patent Application, so that the descriptions of which are all incorporated herein by reference.

TECHNICAL FIELD

The present disclosure relates to vehicle dynamic control apparatuses that perform dynamic control of a vehicle while controlling, in cooperation, a plurality of controlled objects, and to vehicle dynamic control systems each equipped with such a vehicle dynamic control apparatus.

BACKGROUND

US Patent Application Publication No. 2007/0088484 corresponding to Japanese Patent Publication No. 4297150, referred to as a first publication, discloses a vehicle that changes motive power distribution to the front wheels and to the rear wheels according to the amount of understeer or oversteer as an example of lateral motions of the vehicle, and thereafter corrects the steering angles if the amount of understeer or oversteer increases. Thereafter, the vehicle also brakes a selected wheel if the amount of understeer or oversteer increases.

US Patent Application Publication No. 2006/0208564 corresponding to Japanese Patent Publication No. 4455379, referred to as a second publication, discloses an understeer control apparatus. The understeer control apparatus successively carries out reduction in reactive force by an electric power steering device, generation of an alert by an alerting device, and control of braking force distribution to the wheels.

SUMMARY

The vehicle disclosed in the first publication only determines a plurality of controlled objects to be used, and the order of the determined controlled objects to be activated in achieving values of controlled variables required to eliminate understeer or oversteer.

The understeer control apparatus disclosed in the second publication only successively activates a plurality of controlled objects to gradually compensate insufficient controlled variables in order to achieve values of the controlled variables required to reduce understeer.

Specifically, although any of the first and second publications discloses control of lateral motions of a vehicle while controlling, in cooperation, a plurality of controlled objects, it fails to consider the controllable range of each of the plurality of controlled objects, and therefore fails to determine a control request to each of the plurality of controlled objects according to the controllable range for a corresponding one of the plurality of controlled objects. Thus, any of the first, and second publications may cause a control request to a controlled object to exceed performance limitations to be achieved by the controlled object in controlling lateral motions of a vehicle.

In addition, because of no consideration of the controllable range of each of the plurality of controlled objects, any of the first and second publications fails to consider which of the plurality of controlled objects is preferentially activated according to the controllable range of each of the plurality of controlled objects in order to achieve more optimal control of lateral motions of a vehicle.

For example, if the magnitude of a controlled variable, which is as an example of parameters indicative of the controllable range of the controlled variable, of each controlled object is different from the others, determination of one of the plurality of controlled objects based on only the magnitude of the controlled variable may not select a more optimum controlled object with higher response relative to the others, especially in the event of emergency. Thus, it is desired to optimally control lateral motions of a vehicle using a plurality of controlled objects.

Similar to the lateral motions of a vehicle, it is desired to prevent a control request to a controlled object from exceeding performance limitations to be achieved by the controlled object in controlling longitudinal motions and/or pitching motions of a vehicle.

In view of the circumstances set forth above, one aspect of the present disclosure seeks to provide vehicle dynamic control apparatuses, which are designed to address at least one of the problems set forth above.

Specifically, an alternative aspect of the present disclosure aims to provide such vehicle dynamic control apparatuses capable of preventing a control request to a controlled object from exceeding performance limitations to be achieved by the controlled object in controlling the dynamics of a vehicle.

In addition, a further aspect of the present disclosure aims to provide such vehicle dynamic control apparatuses capable of more optimally controlling the dynamics of a vehicle according to controllable range of each of a plurality of controlled objects.

According to one aspect of the present disclosure, there is provided a vehicle dynamic control apparatus for controlling a plurality of controlled objects based on a first parameter associated with a motion of a vehicle in a same direction to fulfill a request value of a second parameter associated with the motion of the vehicle in the same direction and outputted from a control requester. The vehicle dynamic control apparatus includes an availability obtainer configured to obtain an availability corresponding to a controllable range of the first parameter of each of the controlled objects, and to output the availability of the first parameter of each of the controlled objects to the control requester.

In the present disclosure, the term "availability" means a controllable range. That is, all words and phrases using the "availability" can be replaced with words and phrases using the "controllable range". Similarly, all words and phrases using the "controllable range" can be replaced with words and phrases using the "availability".

As described above, the availability of the first parameter of each of the controlled objects is transferred from the availability obtainer to the control requester. This configuration allows the control requester to generate the request value of the second parameter associated with the motion of the vehicle in the same direction in consideration of the availability (controllable range) of the first parameter of each of the controlled objects. Thus, the control requester can generate the request value of the second parameter such that the request value of the second parameter does not exceed performance limitations to be achieved by control of each of the controlled objects using the first parameter. This makes it possible to perform vehicle dynamic control to suit the availability of the first parameter of each of the controlled objects.

Note that the first parameter can be physically identical to the second parameter, or can be physically different from the second parameter.

According to an alternative aspect of the present disclosure, there is provided a vehicle dynamic control system including the vehicle dynamic control apparatus recited in the one aspect of the present disclosure, and the control requester recited in the one aspect of the present disclosure. The control requester is configured to generate the request value of the second parameter based on the availability of the first parameter of each of the controlled objects outputted to the control requester from the availability obtainer.

The vehicle dynamic control system according to the alternative aspect of the present disclosure allows the control requester to generate the request value of the second parameter such that the request value of the second parameter does not exceed performance limitations to be achieved by control of each of the controlled objects using the first parameter. This makes it possible to perform vehicle dynamic control to suit the availability of the first parameter of each of the controlled objects.

According to a further aspect of the present disclosure, there is provided a vehicle dynamic control system including the vehicle dynamic control apparatus recited in the one aspect of the present disclosure, the control requester recited in the one aspect of the present disclosure, and the plurality of controlled objects recited in the one aspect of the present disclosure. The control requester includes at least one application programmed to output, in addition to the second parameter, a request mode, the request mode of the at least one application representing a mode representing that the at least one application places a higher priority on ecology, the availability obtainer is configured to limit, based on the ecology mode as the request mode, the availability of the first parameter of each of the controlled objects to generate a limited availability of the first parameter of each of the controlled objects, and the control requester is configured to generate the request value of the second parameter based on the limited availability of the first parameter of each of the controlled objects outputted to the control requester from the availability obtainer.

The vehicle dynamic control system according to the further aspect of the present disclosure allows the availability of the first parameter of each of the controlled objects to be limited based on the ecology mode. For example, the vehicle dynamic control system according to the further aspect of the present disclosure Allows the availability of the first parameter of each of the controlled objects to be limited to reduce power consumption of each of the controlled objects. Thus, the control requester can generate the request value of the second parameter based on the limited availability of the first parameter of each of the controlled objects so as to reduce power consumption of each of the controlled objects. As a result, it is possible to perform vehicle dynamic control to suit the mode of the request mode on which the at least one application places a higher priority.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which:

FIG. 3 is a block diagram illustrating the detailed structure of a controlled object selector illustrated in FIG. 1;

FIG. 5A is a graph schematically illustrating an example of a selected result by the controllable range calculator when the application request mode is set to a safety mode;

FIG. 5B is a graph schematically illustrating an alternative example of a selected result by the controllable range calculator when the application request mode is set to the safety mode;

FIG. 7A is a map to be used, in the comport mode as the application request mode, for selection of a first controlled object having the highest priority in the plurality of controlled objects;

FIG. 7B is a map to be used, in the comport mode as the application request mode, for selection of a second controlled object having the next higher priority in the plurality of controlled objects;

FIG. 7C is a map to be used, in the comport mode as the application request mode, for selection of a third controlled object having the third higher priority in the plurality of controlled objects;

FIG. 8A is a map to be used, in the safety mode as the application request mode, for selection of a first controlled object having the highest priority in the plurality of controlled objects;

FIG. 8B is a map to be used, in the safety mode as the application request mode, for selection of a second controlled object having the next higher priority in the plurality of controlled objects;

FIG. 8C is a map to be used, in the safety mode as the application request mode, for selection of a third controlled object having the third higher priority in the plurality of controlled objects;

FIG. 9 is a graph schematically illustrating, as a map, a final yaw-rate controllable range for total lateral-motion control of a controlled vehicle;

DETAILED DESCRIPTION OF EMBODIMENT

Figure 1:
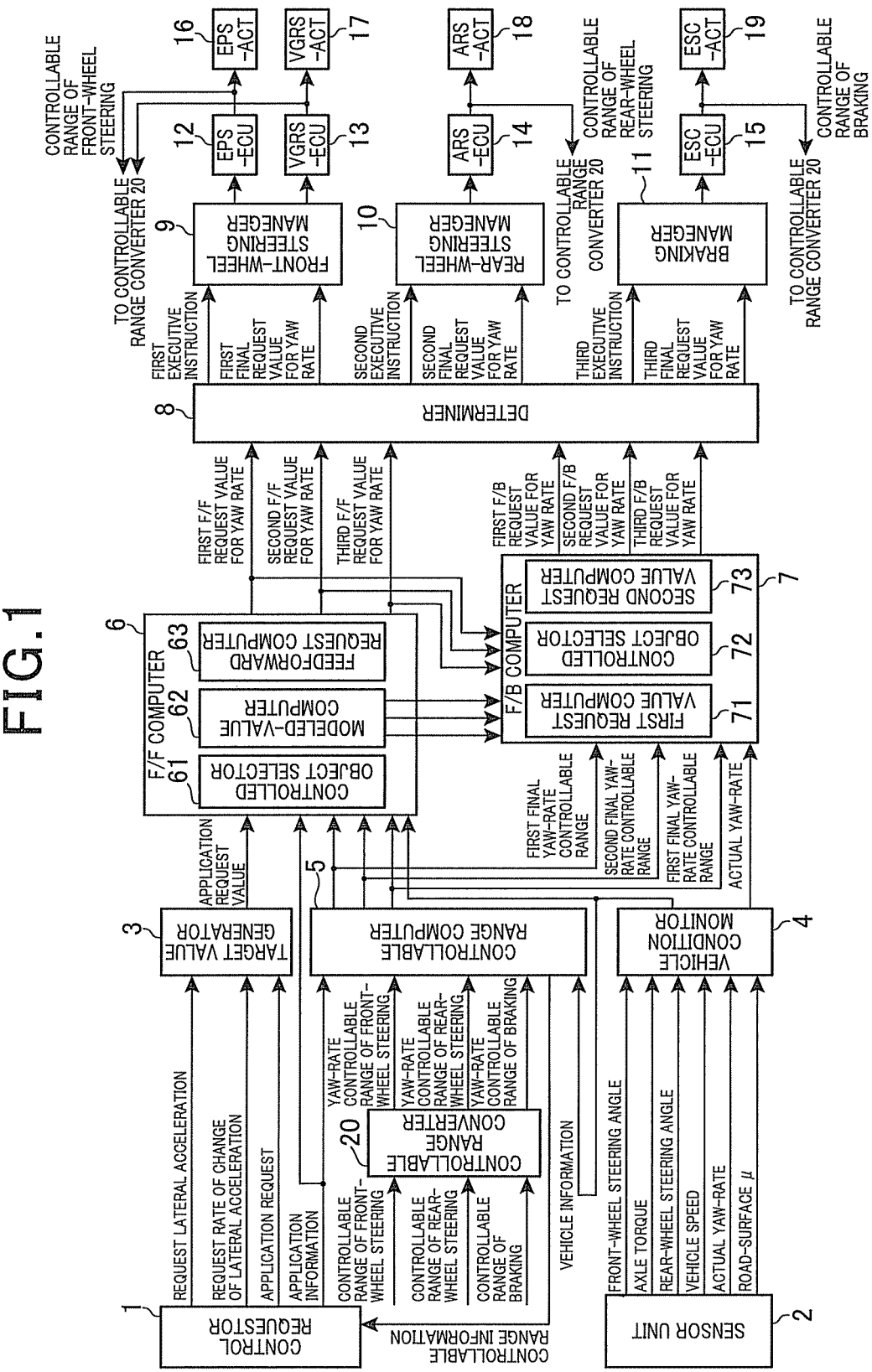
FIG. 1 is a block diagram schematically illustrating an example of the overall structure of a lateral-motion control system according to a first embodiment of the present disclosure.

Embodiments of the present disclosure will be described hereinafter with reference to the accompanying drawings. In the embodiments, like parts between the embodiments, to which like reference characters are assigned, are omitted or simplified in redundant description.

As described above, in the following embodiments, the term "availability" is equivalent to the term "controllable range". Thus, the words and phrases using the term "controllable range" can be replaced with words and phrases using the term "availability".

First Embodiment

An example of the overall structure of a lateral-motion control system for vehicles, to which a lateral-motion control apparatus according to a first embodiment of the present disclosure is applied, is disclosed as a block diagram in FIG. 1. The lateral-motion control system according to this embodiment is designed to control lateral motions of a vehicle by controlling a plurality of controlled objects, specifically, front-wheel steering, rear-wheel steering, and braking of the controlled vehicle.

Referring to FIG. 1, the lateral-motion control system includes a control requester 1, a sensor unit 2, a target value generator 3, a vehicle condition monitor 4, a controllable range (an available) computer 5, a feedforward (F/F) computer 6, a feedback (F/B) computer 7, a determiner 8, various managers 9 to 11, various electronic control units (ECUs) 12 to 15, various actuators (ACTs) 16 to 19 for controlling lateral motions of the controlled vehicle, and a controllable range (an available) converter 20. For example, the target value generator 3, vehicle condition monitor 4, controllable range computer 5, feedforward computer 6, feedback computer 7, and determiner 8, or the elements 3 to 8 and the managers 9 to 11 correspond to the vehicle lateral-motion control apparatus.

Note that each of or some of the blocks 1 to 11 included in the lateral-motion control system can be designed as a hardware circuit, a programmed logic circuit, or a hardware and programmed-logic hybrid circuit.

The control requestor 1 is adapted to output, based on the conditions of the controlled vehicle, request signals associated with lateral motions of the controlled vehicle in accordance with a control request of each of a variety of applications (application programs) that carries out a corresponding routine of the lateral-motion control of the controlled vehicle; these applications are installed in the control requestor 1. In this embodiment, to the control requestor 1, controllable range information is inputted from the controllable range computer 5 described later. Each application is programmed to output a control request (an application request) based on the controllable range info illation inputted from the controllable range computer 5.

For example, the control requestor 1 is provided with at least one controller (not shown) for performing the variety of applications including a lane-keeping control application and a lane-departure prevention application.

The at least one controller runs the lane-keeping application to: capture an image in front of the controlled vehicle; recognize, based on the captured image, lane markers formed on both sides of a lane of a road through which the controlled vehicle is running; and perform lateral-motion control of the controlled vehicle to keep the controlled vehicle within the lane while the controlled vehicle is running through the lane.

The at least one controller runs the lane-departure prevention application to: capture an image in front of the controlled vehicle; recognize, based on the captured image, lane markers formed on both sides of the running lane; perform lateral-motion control of the controlled vehicle to prevent the controlled vehicle from departing from the recognized lane markers while the controlled vehicle is running through the lane; and generates an alarm signal for the driver to prevent the driver from departing the recognized lane markers.

The applications can include any applications to perform lateral-motion control of a controlled vehicle. For example, the applications can include an emergency avoidance application programmed to perform lateral-motion control of the controlled vehicle to avoid collisions with obstacles located on the lane along the travelling direction of the controlled vehicle. The applications also can include a parking assistance application programmed to perform lateral-motion control of the controlled vehicle to guide the controlled vehicle into a desired parking space via an efficient route.

When determining that starting conditions of corresponding lateral-motion control are met, each application is programmed to output, to the lateral-motion control apparatus, request signals indicative of at least one controlled variable required for the corresponding application (corresponding lateral-motion control), and the description and type of the corresponding application. As a result, at least one of the actuators 16 to 19 required for each application is activated to control corresponding lateral-motion of the controlled vehicle according to the request of a corresponding application. In this embodiment, each application requires, as the at least one controlled variable represented by the corresponding request signals, a request positive/negative lateral acceleration Gy and a request change dGy/dt in the lateral acceleration Gy, The remaining request signal used by each application is represented as an "execution request". The execution request used by each application represents the description and type of a corresponding application, and whether the corresponding application is to be performed.

The control requestor 1 is also adapted to transfer, to the controllable range computer 5, application information indicative of a request mode depending on each application, and the priorities of the respective controlled objects for each application. In this embodiment, the request mode depending on a corresponding application represents what the corresponding application places a higher priority on. For example, as the request mode, safety mode, comfort mode, and ecology (eco) mode can be used. That is, the request mode depending on each application serves as an indicator to select one of the applications based on the descriptions of the applications. For example, if an application whose request mode is the safety mode is selected, lateral-motion control with high responsivity is implemented, and otherwise, if an application whose request mode is the comfort mode is selected, lateral-motion control with low responsivity and without excessive burden on the occupants in the controlled vehicle. If an application whose request mode is the eco mode is selected, lateral-motion control with low energy consumption is implemented. The priorities of the respective controlled objects for each application represent the order of the priorities of the respective controlled objects that should be selected when lateral-motion control corresponding to the application is performed.

The sensor unit 2 is adapted to input, to the vehicle condition monitor 4, information indicative of various conditions of the controlled vehicle. Specifically, the sensor unit 2 is adapted to input, to the vehicle condition monitor 4, measured signals and data signals of results of operations as the information indicative of the various conditions of the controlled vehicle; these measured and data signals represent the various conditions of the controlled vehicle.

In this embodiment, the sensor unit 2 is adapted to transfer, to the vehicle condition monitor 4, information associated with front-wheel steering angle, axle torque, rear-wheel steering angle, and vehicle speed. Specifically, the sensor unit 2 includes, for example, steering angle sensors for outputting measured signals each indicative of a current steering angle of a corresponding front or rear wheel, and is adapted to use the measured signals of the steering angle sensors as the information associated with the front-wheel steering angle and rear-wheel steering angle. The sensor unit 2 includes, for example, a brake ECU installed in the controlled vehicle for calculating currently generated torque of each axle, and is adapted to use the calculated results of the brake ECU as the information associated with the axle torque. The sensor unit 2 includes, for example, a speed sensor for each wheel for outputting a measured signal indicative of the speed of a corresponding wheel, and is adapted to calculate the speed of the controlled vehicle based on the measured signals of the respective speed sensors for the respective wheels, and to use the calculated speed of the controlled vehicle as the information associated with the vehicle speed.

The sensor unit 2 also includes, for example, a yaw rate sensor for outputting a measured signal indicative of the actual yaw rate of the controlled vehicle. The measured signal of the yaw rate sensor or the actual yaw rate calculated based on the measured signal of the yaw rate sensor is transferred from the sensor unit 2 to the feedback computer 7 via the vehicle condition monitor 4. The sensor unit 2 also includes, for example, a section for measuring the friction coefficient ($\mu$) between the tires of the controlled vehicle and the road surface on which the controlled vehicle is running; the friction coefficient will be also referred to as "road-surface $\mu$" hereinafter. For example, because the brake ECU measures the friction coefficient ($\mu$) between the tires of the controlled vehicle and the road surface based on the speed of each wheel, the sensor unit 2 is adapted to transfer, to the vehicle condition monitor 4, the friction coefficient ($\mu$) measured by the brake ECU.

The target value generator 3 is adapted to arbitrate, based on the application request (control request), the requests of the applications using the request positive/negative lateral acceleration Gy and the request change dGy/dt in the lateral acceleration Gy inputted from the control requester 1. For example, the positive acceleration Gy represents lateral acceleration in right-hand turn of the controlled vehicle, and the negative acceleration Gy represents lateral acceleration in left-hand turn of the controlled vehicle.

As a result of the arbitration, the target value generator 3 is adapted to select at least one application that should be performed, and convert the request positive/negative lateral acceleration Gy and the request change dGy/dt in the lateral acceleration Gy into an application request value (a total target value) for at least one control parameter for lateral-motion control of the controlled vehicle; the application request value for the at least one control parameter for lateral-motion control is required to meet the request of the selected at least one application. For example, the at least one control parameter for lateral-motion control includes yaw rate $\gamma$ and the change d $\gamma$/dt in the yaw rate $\gamma$. Then, the target value generator 3 is adapted to output the application request value (total target value) for the at least one control parameter for lateral-motion control.

For example, as the application request value for the yaw rate $\gamma$, a request absolute quantity of the yaw rate $\gamma$ within a preset control cycle of a corresponding application can be used, and as the application request value for the change d$\gamma$/dt in the yaw rate $\gamma$, a value of the change d $\gamma$/dt in the yaw rate $\gamma$ within the preset control cycle of the corresponding application can be used.

The target value generator 3 is adapted to arbitrate the requests of the applications according to the types of the applications.

For example, the target value generator 3 is adapted to add values of the request positive/negative lateral acceleration Gy of all the applications to obtain the sum of the values of the request positive/negative lateral acceleration Gy of all the applications, and add values of the request change dGy/dt in the lateral acceleration Gy of all the applications to obtain the sum of the values of the request change dGy/dt in lateral acceleration of all the applications.

Then, the target value generator 3 is adapted to output an application request value (a total target value) of the yaw rate $\gamma$ corresponding to the sum of the values of the request positive/negative lateral acceleration Gy of all the applications, and output an application request value (a total target value) for the change d $\gamma$/dt in the yaw rate $\gamma$ corresponding to the sum of the values of the request change dGy/dt in the lateral acceleration Gy of all the applications. Because the application request value for the yaw rate $\gamma$ corresponds to the sum of the values of the request positive/negative lateral acceleration Gy of all the applications and the application request value for the change d $\gamma$/dt in the yaw rate $\gamma$ corresponding to the sum of the values of the request change dGy/dt in the lateral acceleration Gy of all the applications, it is possible to perform lateral-motion control of the controlled vehicle, which meets the requests of all the applications.

In addition, if the applications are prioritized, the target value generator 3 is adapted to select one application with the highest priority in the applications, and convert the request positive/negative lateral acceleration Gy and the request change dGy/dt in the lateral acceleration Gy into an application request value of the yaw rate $\gamma$ required to meet the request of the selected application and an application request value for the change d γ/dt in the yaw rate γ required to meet the request of the selected application, respectively. Then, the target value generator 3 is adapted to output the application request value for the yaw rate γ and the application request value for the change d γ/dt in the yaw rate γ. Because the application requests of the respective applications represent one of the applications to be performed, the target value generator 3 can easily select, in the applications, one application that is to be performed as the highest application in priority.

Note that, in this embodiment, the request positive/negative lateral acceleration Gy and the request change dGy/dt in the lateral acceleration Gy are used as the controlled variables required for each application, which are inputted from the control requester 1 to the target value generator 3. In this embodiment, the yaw rate γ and the change d γ/dt in the yaw rate γ, into which the request positive/negative lateral acceleration Gy and the request change dGy/dt in the lateral acceleration Gy has been converted, are used as control parameters (control variables) for lateral-motion control of the controlled vehicle. This is because the ACTs 16 to 19 can easily manipulate the yaw rate γ and the change d γ/ dt in the yaw rate γ. This structure can be modified as follows.

Specifically, the yaw rate γ and the change d γ/dt in the yaw rate γ can be used as the controlled variables required for each application, which are inputted from the control requester 1 to the target value generator 3, and used as control parameters (control variables) for lateral-motion control of the controlled vehicle. Similarly, the request positive/negative lateral acceleration Gy and the request change dGy/dt in the lateral acceleration Gy can be used as the controlled variables required for each application, which are inputted from the control requester 1 to the target value generator 3, and used as control parameters (control variables) for lateral-motion control of the controlled vehicle.

In addition, the yaw rate γ and the change d γ/dt in the yaw rate γ can be used as the controlled variables required for each application, which are inputted from the control requester 1 to the target value generator 3. In addition, the positive/negative lateral acceleration Gy and the change dGy/dt in the lateral acceleration Gy, into which the yaw rate γ and the change d γ/dt in the yaw rate γ have been converted, can be used as control parameters (control variables) for lateral-motion control of the controlled vehicle.

The vehicle condition monitor 4 is operative to obtain vehicle information indicative of the current conditions of the controlled vehicle based on the information indicative of the various conditions of the controlled vehicle from the sensor unit 2, and output the vehicle information to the controlled range computer 5 while monitoring them.

Specifically, the vehicle condition monitor 4 is adapted to obtain currently ideal front-wheel steering angles, currently ideal rear-wheel steering angles, currently ideal front-axle torque, currently ideal rear-axle torque, and a currently ideal speed of the controlled vehicle based on the current front-wheel steering angles, the rear-wheel steering angles, the current front-axle torque, the current rear-axle torque, and the current speed of the controlled vehicle measured by the sensor unit 2. These currently ideal values, which should be ideally generated by the vehicle under the current conditions of the vehicle, can be obtained in accordance with commonly well-known equations based on the current front-wheel steering angles, the rear-wheel steering angles, the current front-axle torque, the current rear-axle torque, and the current speed of the controlled vehicle. In addition, the vehicle condition monitor 4 is also operative to obtain, from the sensor unit 2, the road-surface μ, which represents the running conditions of the road surface, as an item of the vehicle information.

The controllable range computer 5 is designed as, for example, a controllable range obtainer. Specifically, the controllable range computer 5 is adapted to receive controllable range of each of the ACTs 16 to 19 from a corresponding one of the ECUs 12 to 15 via the controllable range converter 20, and obtain, based on the received controllable range of each of the ACTs 16 to 19, first information associated with controllable range of each of the controlled objects (the front-wheel steering, the rear-wheel steering, and the braking).

The controllable range computer 5 is also adapted to compute controllable range of overall (total) lateral-motion control of the controlled vehicle based on the first information of each of the controlled objects, the vehicle information supplied from the vehicle condition monitor 4, and the application information supplied from the control requester 1. The controllable range computer 5 is further adapted to output information (controllable range information) of the controllable range of the overall lateral-motion control of the controlled vehicle to the feedforward computer 6 and the feedback computer 7.

Note that the controllable range (availability) of an element means a conceptual term indicative of the controllable range of at least one controlled variable that can be outputted from the structural element. For example, the controllable range (availability) of an element includes the upper limit and/or lower limit of at least one controlled variable that can be outputted from the element, and the upper limit and/or lower limit of the change in the at least one controlled variable; the change in the at least one controlled variable represents responsivity upon the at least one controlled variable is being controlled.

For example, in lateral-motion control of a controlled vehicle, the controllable range of an element includes controllable range of the element in the direction of turning left and controllable range of the element in the direction of turning right. In this embodiment, because the turning direction of the controlled vehicle can be grasped by the direction (sign) of the request lateral acceleration Gy, as the controllable range of an element, any one of the controllable range of the element in right-hand turn of the controlled vehicle and the controllable range of the element in left-hand turn of the controlled vehicle is used in each application. In the emergency avoidance application, as the controllable range of an element, both the controllable range of the element in right-hand turn of the controlled vehicle and the controllable range of the element in left-hand turn of the controlled vehicle can be used because, in the event of emergency, the controlled vehicle can turn in right-hand direction and in left-hand direction.

For example, the controllable range of each of the ACTs 16 to 19 includes the upper limit of at least one controlled variable used by the ACTs 16 to 19, and the upper limit of the responsivity (the rate) of the at least one controlled variable used by the ACTs 16 to 19. The controllable range of each of the controlled objects (the front-wheel steering, the rear-wheel steering, and the braking) includes the upper limit of at least one controlled variable used for controlling each of the controlled objects, and the upper limit of the responsivity (the rate) of the at least one controlled variable used for controlling each of the controlled objects. The controllable range of each of the controlled objects can be obtained based on the controllable ranges of the ACTs 16 to 19. The controllable ranges of the ACTs 16 to 19 are respectively supplied from the corresponding ECUs 12 to 15 to the controllable range computer 5 via the controllable range converter 20 as maps or the other similar data; these maps represent the conditions of the ACTs 16 to 19.

The total of the controllable ranges of the ACTs 16 and 17, which are designed to control the front-wheel steering, constitutes the controllable range of the front-wheel steering, and the controllable range of the ACT 18 designed to control the rear-wheel steering constitute the controllable range of the rear-wheel steering. Similarly, the controllable range of the ACT 19 designed to control the braking constitutes the controllable range of the braking. For this reason, transfer of the controllable ranges of the ACTs 16 to 19 from the ECUs 12 to 15 to the controllable range computer 5 means transfer of the controllable ranges of the controlled objects to the controllable range computer 5. Thus, FIG. 1 illustrates that the controllable range of the front-wheel steering, the rear-wheel steering, and the braking are inputted to the controllable range computer 5 via the controllable range converter 20. More specifically, the controllable range converter 20 is operative to convert the controllable ranges of the front-wheel steering, the rear-wheel steering, and the braking into the controllable ranges of the front-wheel steering, the rear-wheel steering, and the braking in terms of yaw-rate, and to input them to the controllable range computer 5.

Note that the controllable range of the overall lateral-motion control of the controlled vehicle means the total controllable range of at least one controlled variable that can be outputted from the controllable range computer 5 based on the controllable range of each controlled object, the application information, and the vehicle information. Computation of the controllable range of the overall lateral-motion control of the controlled vehicle by the controllable range computer 5 will be described in detail later.

The feedforward computer 6 is adapted to compute a feedforward request value for at least one of the controlled objects based on the application request value (total target value) for the at least one control parameter supplied from the target value generator 3, the controllable range information supplied from the controllable range computer 5, and the application information. The feedforward request value is required to perform feedforward control of the corresponding at least one of the controlled objects.

Specifically, the feedforward computer 6 includes a controlled object selector 61, a modeled-value computer 62, and a feedforward request computer 63.

The controlled object selector 61 is adapted to select one or more controlled objects in the plurality of controlled objects based on, in addition to the application request value for the at least one control parameter supplied from the target value generator 3, the controllable range information and the application information supplied via the controllable range computer 5.

Specifically, the controlled object selector 61 is adapted to select, in the plurality of controlled objects, one or more controlled objects to be used to perform lateral-motion feedforward control. Selection of one or more controlled objects in the plurality of controlled objects is for example performed when a control request associated with lateral-motion control is outputted, for example, when the lane-keeping application is performed. The specific structure of the controlled object selector 61 and how to select one or more controlled objects will be described in detail later.

The modeled-value computer 62 is adapted to, when at least one controlled object is selected by the controlled object selector 61, compute at least one modeled value for the at least one selected controlled object based on the controllable range information supplied from the controllable range computer 5.

Specifically, when controlled objects are selected in the plurality of controlled objects by the controlled object selector 61, allocation of the application request value (total target value) for the at least one control parameter to the selected controlled objects is determined. For example, if two controlled objects are selected by the controlled object selector 61 in a method described later, the upper limit of the at least one control parameter (a controlled variable and/or the change in the corresponding controlled variable) is generated as a local application request value allocated to the at least one control parameter in the first controlled object selected first. If the upper limit of the at least one control parameter does not completely satisfy the application request value, the shortage is generated as a local application request value allocated to the at least one control parameter in the second controlled object selected next.

Note that a local application request value allocated to the at least one parameter in a selected controlled object is different from a modeled value that can be actually generated in the selected controlled object. For this reason, the modeled-value computer 62 stores therein previously prepared date indicative of the relationship between the variable of application request value for at least one control parameter in each of the controlled objects and the variable of modeled value of the corresponding at least one control parameter in a corresponding one of the controlled objects. Then, the modeled-value computer 62 is adapted to obtain a modeled value of at least one control parameter in at least one selected controlled object corresponding to the local application request value for the at least one control parameter.

The feedforward request computer 63 is adapted to compute a feedforward request value for the at least one control parameter in the at least one selected controlled object based on the difference between the modeled value of the at least one control parameter and the local application request value for the at least one control parameter in the at least one selected controlled object. One of various well-known methods of computing a feedforward request value can be used by the feedforward request computer 63. The feedforward request value for the at least one control parameter in each selected controlled object, computed by the feedforward request computer 63, is outputted from the feedforward request computer 63 to the determiner 8 and the feedback computer 7.

In this embodiment, the at least one control parameter includes the yaw rate $\gamma$ (the absolute quantity of the yaw rate $\gamma$). A feedforward request value for the yaw rate $\gamma$ in the front-wheel steering as the selected controlled object will be represented as a first F/F request value for the front-wheel steering, a feedforward request value for the yaw rate $\gamma$ in the rear-wheel steering as the selected controlled object will be represented as a second F/F request value for the rear-wheel steering, and a feedforward request value for the yaw rate $\gamma$ in the breaking as the selected controlled object will be represented as a third F/F request value for the braking.

The feedback computer 7 is adapted to compute a feedback request value for at least one of the controlled objects based on: the modeled value of the at least one control parameter supplied from the feedforward computer 6; the controllable range information supplied from the controllable range computer 5; the application information; and the actual yaw rate supplied from the vehicle condition monitor 4. The feedback request value is required to perform feedback control of the corresponding at least one of the controlled objects.

Specifically, the feedback computer 7 includes a first feedback request computer 71, a controlled object selector 72, and a second feedback request computer 72.

The first feedback request computer 71 is adapted to compute a total feedback request value for the at least one control parameter based on the difference between the sum of the modeled values of the at least one control parameter (yaw rate) of the selected controlled objects obtained from the modeled-value computer 62 and the actual yaw rate measured by the sensor unit 2.

The controlled object selector 72 is adapted to select one or more controlled objects in the plurality of controlled objects based on the total feedback request value for the at least one control parameter, the controllable range information and the application information supplied via the controllable range computer 5, and the F/F request values supplied from the feedforward computer 6.

Specifically, the controlled object selector 72 is adapted to select, in the plurality of controlled objects, one or more controlled objects to be used to perform lateral-motion feedback control. The functions of the controlled object selector 72 are substantially identical to those of the controlled object selector 61. One or more controlled objects selected by the controlled object selector 72 can be the same as one or more controlled objects selected by the controlled object selector 61 or different therefrom.

The second feedback request computer 73 is adapted to allocate, when at least one controlled object is selected by the controlled object selector 72, the total feedback request value to the at least one selected controlled object based on a margin of each of the controlled objects calculated by the controlled object selector 72, thus computing a local feedback request value for the at least one selected controlled object. The local feedback request value for the at least one selected controlled object is outputted from the second feedback request computer 73 to the determiner 8. One of various well-known methods of computing a total feedback request value can be used by the feedback computer 71. The margin of each controlled object means an allowance of the absolute quantity of a controlled variable (yaw rate), which can be outputted from a corresponding controlled object and an allowance of the change in the controlled variable, which can be outputted from a corresponding controlled object.

In this embodiment, a local feedback request value for the yaw rate $\gamma$ in the front-wheel steering as the selected controlled object will be represented as a first F/B request value for the front-wheel steering, a local feedback request value for the yaw rate $\gamma$ in the rear-wheel steering as the selected controlled object will be represented as a second F/B request value for the rear-wheel steering, and a local feedback request value for the yaw rate $\gamma$ in the breaking as the selected controlled object will be represented as a third F/B request value for the braking.

The determiner 8 is adapted to compute a final request value for the at least one control parameter, that is, a final request value for the yaw rate based on the feedforward request value for at least one selected controlled object supplied from the feedforward computer 6 and the local feedback request value for the at least one selected controlled object supplied from the feedback computer 7.

In addition, the determiner 8 is adapted to determine at least one of the three controlled objects (the front-wheel steering, the rear-wheel steering, and the braking) to which control authority is given. Thus, at least one controlled object, to which control authority is given, is determined in the three controlled objects (the front-wheel steering, the rear-wheel steering, and the braking). For example, the determiner 8 is adapted to determine at least one of the three controlled objects to which control authority is given using a criterion of whether at least one of the feedforward request value and the local feedback request value is generated for each of the three controlled objects. The determiner 8 is also adapted to output, to a corresponding manager, the final request value for the yaw rate for the at least one controlled object to which control authority is given. The determiner 8 is also adapted to output, to a corresponding manager, an executive instruction of control of the at least one controlled object to which control authority is given. Hereinafter, a controlled object to which control authority is given will be referred to as an authorized controlled object.

The executive instruction is a command to instruct execution of lateral-motion control of a corresponding authorized controlled object. For example, if control authority is given to the front-wheel steering, a first executive instruction for the front-wheel steering is outputted from the determiner 8 as the executive instruction. If control authority is given to the rear-wheel steering, a second executive instruction for the rear-wheel steering is outputted from the determiner 8 as the executive instruction. if control authority is given to the braking, a third executive instruction for the braking is outputted from the determiner 8 as the executive instruction.

The final request value for the yaw rate for at least one authorized controlled object represents a value of the yaw rate $\gamma$ required to be generated in control of the at least one authorized controlled object. For example, the final request value for the yaw rate for at least one authorized controlled object can be obtained by calculating the sum of the feedforward request value for the yaw rate $\gamma$ and the local feedback request value for the yaw rate $\gamma$ for the at least one authorized controlled object.

Specifically, the sum of the first F/F request value and the first F/B request value obtains the first final request value for the yaw rate for the front-wheel steering, and the sum of the second F/F request value and the second F/B request value obtains the second final request value for the yaw rate for the rear-wheel steering. Moreover, the sum of the third F/F request value and the third F/B request value obtains the third final request value for the yaw rate for the braking. The final request value for the yaw rate for at least one authorized controlled object is transferred to a corresponding manager.

Each of the managers 9 to 11 is adapted to, when the executive instruction and the final request value for the yaw rate for a corresponding controlled object are inputted, convert the final request value for the yaw rate into a commanded physical value of a predetermined control variable, and supply the commanded physical value of the predetermined control variable to a corresponding one of the ECUs 12 to 14.

Specifically, when the executive instruction and the first final request value for the yaw rate are inputted, the front-wheel steering manager 9 converts the first final request value for the yaw rate into commanded values of the steering angles of the front wheels, and supply the commanded values of the steering angles of the front wheels to the respective ECUs 12 and 13.

When the executive instruction and the second final request value for the yaw rate are inputted, the rear-wheel steering manager 10 converts the second final request value for the yaw rate into commanded values of the steering angles of the rear wheels, and supply the commanded values of the steering angles of the rear wheels to the ECU 14.

When the executive instruction and the third final request value for the yaw rate are inputted, the braking manager 11 converts the third final request value for the yaw rate into a commanded value of the additional torque for each wheel, and supply the commanded value of the additional torque for each wheel to the ECU 15.

In this embodiment, as the ACTs 16 to 19, an electronically controlled power-assisted steering ACT (EPS ACT), that is, a motor, 16, a variable gear ratio steering ACT (VGRS ACT) 17, an active rear steering ACT (ARS ACT) 18, and an electronic stability control ACT (ESC ACT) 19 are used. The EPS ACT 16 is operative to control the steering angles of the front wheels, and the VGRS ACT 17 is also operative to control the steering angles of the front wheels. The ARS ACT 18 is operative to control the steering angles of the rear wheels, and the ESC ACT 19 is operative to brake the individual wheels to keep the controlled vehicle under control.

As described above, the steering angles of the front wheels are controlled by at least one of the EPS ACT 16 and the VGRS ACT 17. That is, a common controlled object is controlled by corresponding different ACTs. Thus, a manager for managing the different ACTs is adapted to arbitrate which of the different ACTs is activated, and/or how to allocate the corresponding final request value for the yaw rate to the different ACTs.

For example, the manager 9 corresponding to the EPS ACT 16 and the VGRS ACT 17 for controlling the steering angles of the front wheels is adapted to arbitrate which of the EPS ACT 16 and the VGRS ACT 17 is activated, and/or how to allocate the first final request value for the yaw rate to the EPS ACT 16 and the VGRS ACT 17. Thereafter, the manager 9 is adapted to supply, based on a result of the arbitration, at least part of the first final request value for the yaw rate to each of the ECUs 12 and 13 corresponding to the EPS ACT 16 and the VGRS ACT 17.

Each of the ECUs 12 to 15 is adapted to output an instruction to a corresponding ACT to instruct the corresponding ACT to implement a corresponding final request value for the yaw rate. Specifically, at least one of the ECUs 12 and 13 is adapted to control at least one of the EPS ACT 16 and the VGRS ACT 17, thus implementing the commanded values of the steering angles of the front wheels. The ECU 14 is adapted to control the ARS ACT 18, thus implementing the commanded values of the steering angles of the rear wheels. The ECU 15 is adapted to control the ESC ACT 19, thus implementing the commanded additional torque for each wheel.

Each of the ECUs 12 to 15 is adapted to grasp the controllable range of each of the ACTs 16 to 19 based on the operating conditions of the ACTs 16 to 19, and to transfer the controllable range of each of the ACTs 16 to 19 to the controllable range computer 5. As described above, the controllable range of the ACTs 16 to 19 includes the controllable range of the front-wheel steering, the controllable range of the rear-wheel steering, and the controllable range of the braking.

The controllable range of the front-wheel steering represents the controllable range of the steering angles of the front wheels to be controlled by the EPS ACT 16 and the VGRS ACT 17. The controllable range of the rear-wheel steering represents the controllable range of the steering angles of the rear wheels to be controlled by the ARS ACT 18. The controllable range of the braking represents the controllable range of the additional torque for each wheel to be controlled by the ESC ACT 19.

Specifically, the controllable range of the front-wheel steering includes the controllable range of the absolute quantity of the steering angle of each front wheel and the controllable range of the angular velocity of the steering angle of each front wheel; the angular velocity of the steering angle of each front wheel represents the change in the steering angle of a corresponding front wheel, and demonstrates the responsivity of the steering angle of a corresponding front wheel.

Similarly, the controllable range of the rear-wheel steering includes the controllable range of the absolute quantity of the steering angle of each rear wheel and the controllable range of the angular velocity of the steering angle of each rear wheel; the angular velocity of the steering angle of each rear wheel represents the change in the steering angle of a corresponding rear wheel, and demonstrates the responsivity of the steering angle of a corresponding rear wheel.

In addition, the controllable range of the braking includes the controllable range of the absolute quantity of the torque of each of the front axle and rear axle and the controllable range of the change in the torque of each of the front axle and rear axle. The change in the torque of each of the front axle and rear axle demonstrates the responsivity of the braking of a corresponding one of the front axle and rear axle.

As described above, the lateral-motion control apparatus set forth above is configured to compute the controllable ranges of the ACTs 16 to 19, and the controllable range of the overall lateral-motion control of the controlled vehicle when the request signals are inputted to the lateral-motion control apparatus. The lateral-motion control apparatus is also configured to control each of the ACTs 16 to 19 based on the controllable ranges of the ACTs 16 to 19 and the controllable range of the overall lateral-motion control of the controlled vehicle.

Next, the configuration of each of the controllable range converter 20, the controllable range computer 5, and the controlled object selector 61 (72) will be described in detail hereinafter.

Figure 2:
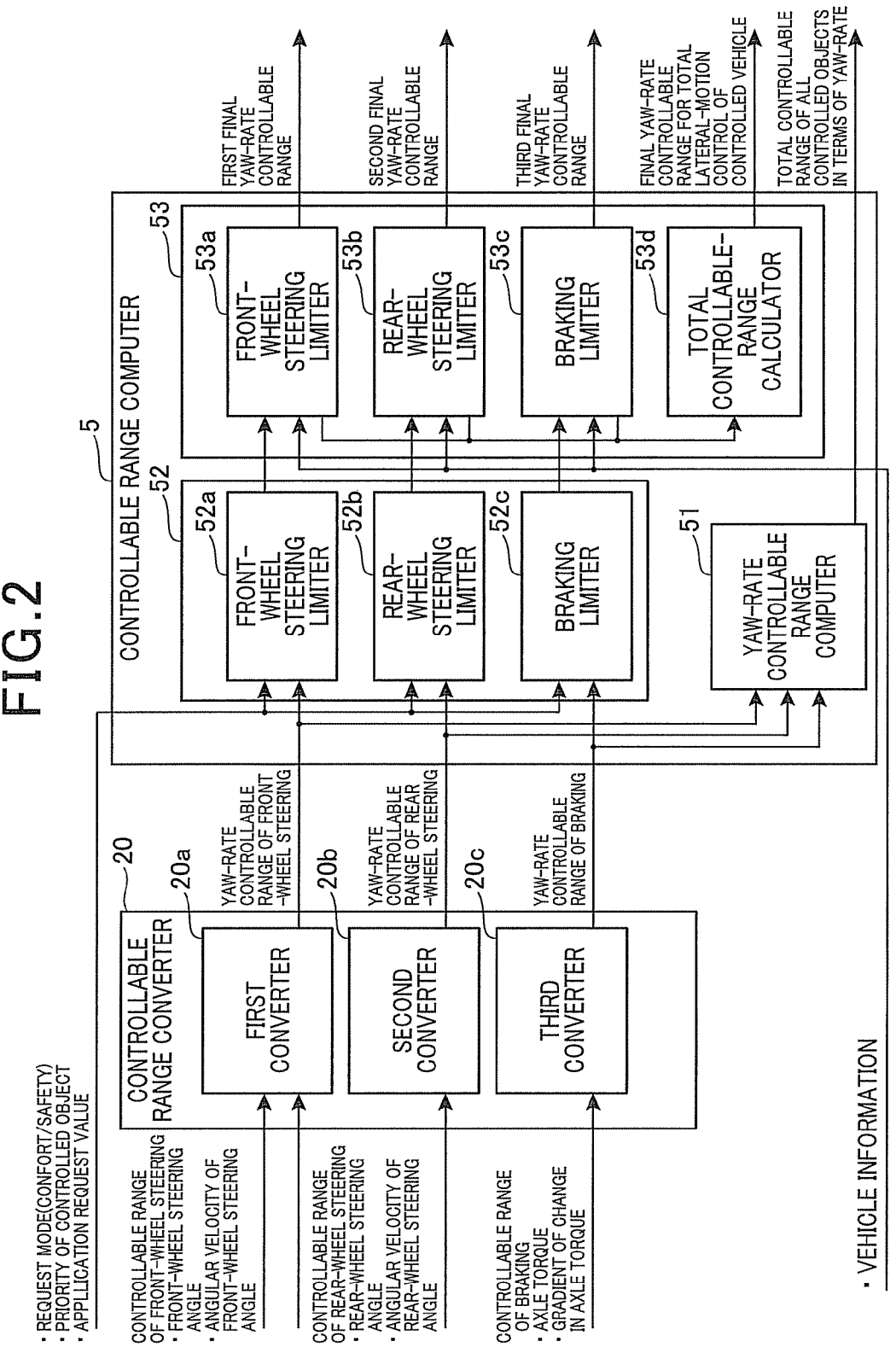
FIG. 2 is a block diagram illustrating the detailed structure of each of a controllable range computer and a controllable range converter illustrated in FIG. 1.

FIG. 2 is a block diagram illustrating the detailed structure of each of the controllable range computer 5 and the controllable range converter 20.

Referring to FIG. 2, the controllable range converter 20 is operative to convert the controllable ranges of the front-wheel steering, the rear-wheel steering, and the braking into controllable ranges of the front-wheel steering, the rear-wheel steering, and the braking in terms of yaw-rate.

The controllable range converter 20 includes a first converter 20a for physical conversion of the controllable range of the front-wheel steering, a second converter 20b for physical conversion of the controllable range of the rear-wheel steering, and a third converter 20c for physical conversion of the controllable range of the braking.

The first converter 20a is adapted to convert the controllable range of the front-wheel steering into a controllable range of the front-wheel steering in terms of yaw-rate, thus calculating a yaw-rate controllable range of the front-wheel steering. The second converter 20b is adapted to convert the controllable range of the rear-wheel steering into a controllable range of the rear-wheel steering in terms of yaw-rate, thus calculating a yaw-rate controllable range of the rear-wheel steering. The third converter 20c is adapted to convert the controllable range of the braking into a controllable range of the braking in terms of yaw-rate, thus calculating a yaw-rate controllable range of the braking.

For example, because the at least one control parameter in the front-wheel steering includes the steering angle of each front wheel and the angular velocity of the steering angle of each front wheel, the first converter 20a converts the steering angle of each front wheel into an absolute quantity of the yaw rate $\gamma$, and converts the angular velocity of the steering angle of each front wheel into the change $d\gamma/dt$ in the yaw rate $\gamma$. The controllable range of each of the yaw rate $\gamma$ and the change $d\gamma/dt$ in the yaw rate $\gamma$ is represented as the yaw-rate controllable range of the front-wheel steering. In other words, the yaw-rate controllable range of the front-wheel steering is a function of the absolute quantity of the yaw rate $\gamma$ and the change $d\gamma/dt$ in the yaw rate $\gamma$.

Similarly, because the at least one control parameter in the rear-wheel steering includes the steering angle of each rear wheel and the angular velocity of the steering angle of each rear wheel, the second converter 20b converts the steering angle of each rear wheel into an absolute quantity of the yaw rate γ, and converts the angular velocity of the steering angle of each rear wheel into the change d γ/dt in the yaw rate γ. The controllable range of each of the yaw rate γ and the change d γ/dt in the yaw rate γ is represented as the yaw-rate controllable range of the rear-wheel steering. In other words, the yaw-rate controllable range of the rear-wheel steering is a function of the absolute quantity of the yaw rate γ and the change d γ/dt in the yaw rate γ.

In addition, because the at least one control parameter in the braking includes the torque of each of the front axle and rear axle and the change in the torque of each of the front axle and rear axle, the third converter 20c converts the torque of each of the front axle and rear axle into an absolute quantity of the yaw rate γ, and converts the gradient of change in the torque of each of the front axle and rear axle into the change d γ/dt in the yaw rate γ. The controllable range of each of the yaw rate γ and the change d γ/dt in the yaw rate γ is represented as the yaw-rate controllable range of the braking. In other words, the yaw-rate controllable range of the braking is a function of the absolute quantity of the yaw rate γ and the change d γ/dt in the yaw rate γ.

The controllable range computer 5 includes a yaw-rate controllable range computer 51, a first limiter 52, and a second limiter 53.

The yaw-rate controllable range computer 51 is adapted to calculate the sum of the yaw-rate controllable range of the front-wheel steering, the yaw-rate controllable range of the rear-wheel steering, and the yaw-rate controllable range of the braking to thereby calculate a total yaw-rate controllable range of all the controlled objects. In other words, the total yaw-rate controllable range of all the controlled objects is a function of the absolute quantity of the yaw rate γ and the change d γ/dt in the yaw rate γ.

The first limiter 52 is adapted to perform an application-requested limitation of at least one of the yaw-rate controllable range of the front-wheel steering, the yaw-rate controllable range of the rear-wheel steering, and the yaw-rate controllable range of the braking in accordance with the application request mode included in the application information and/or the priorities of the controlled objects. That is, at least one of the yaw-rate controllable range of the front-wheel steering, the yaw-rate controllable range of the rear-wheel steering, and the yaw-rate controllable range of the braking is limited based on a request from an application. For example, if there is a request from an application not to use braking, the first limiter 52 forcibly sets the yaw-rate controllable range of the braking to zero.

Specifically, the first limiter 52 is comprised of a front-wheel steering limiter 52a, a rear-wheel steering limiter 52b, and a braking limiter 52c. Each of the limiters 52a, 52b, and 52c is adapted to limit a corresponding yaw-rate controllable range in accordance with the application request mode included in the application information and/or the priorities of the controlled objects, thus generating a limited yaw-rate controllable range of a corresponding controlled object.

The second limiter 53 is adapted to perform limitation of at least one of the limited yaw-rate controllable ranges of the respective front-wheel steering, the rear-wheel steering, and the braking in accordance with information associated with the travelling of the controlled vehicle. That is, at least one of the limited yaw-rate controllable ranges of the respective front-wheel steering, the rear-wheel steering, and the braking is further limited based on the vehicle information. For example, if the road surface on which the controlled vehicle is travelling has a low value of the friction coefficient (μ), it is preferable to avoid the use of braking for prevention of slippage. For this reason, if the friction coefficient (μ) of the road surface is lower than a threshold, the second limiter 53 forcibly sets the limited yaw-rate controllable range of the braking to zero.

Specifically, the second limiter 53 is comprised of a front-wheel steering limiter 53a, a rear-wheel steering limiter 53b, a braking limiter 53c, and a total controllable-range calculator 53d.

Each of the first to third limiters 53a to 53c is adapted to perform limitation of a corresponding limited yaw-rate controllable range in accordance with the vehicle information, thus generating a final yaw-rate controllable range of a corresponding controlled object. That is, the first to third limiters 53a to 53c generate a first final yaw-rate controllable range of the front-wheel steering, a second final yaw-rate controllable range of the rear-wheel steering, and a third final yaw-rate controllable range of the braking, respectively. In other words, each of the first final yaw-rate controllable range of the front-wheel steering, second final yaw-rate controllable range of the rear-wheel steering, and third final yaw-rate controllable range of the braking is a function of the absolute quantity of the yaw rate γ and the change d γ/dt in the yaw rate γ.

The total controllable-range calculator 53d is adapted to calculate a final yaw-rate controllable range for total lateral-motion control of the controlled vehicle based on the first final yaw-rate controllable range of the front-wheel steering, second final yaw-rate controllable range of the rear-wheel steering, and third final yaw-rate controllable range of the braking. Specifically, the total controllable-range calculator 53d calculates, as the final yaw-rate controllable range for total lateral-motion control of the controlled vehicle, the sum of the first final yaw-rate controllable range of the front-wheel steering, the second final yaw-rate controllable range of the rear-wheel steering, and the third final yaw-rate controllable range of the braking. In other words, the final yaw-rate controllable range for total lateral-motion control of the controlled vehicle is a function of the absolute quantity of the yaw rate γ and the change d γ/dt in the yaw rate γ.

As described above, the controllable range computer 5 is configured to correct, based on the application request and/or the vehicle information, the controllable range of each of the controlled objects in terms of yaw-rate; the controllable range of each controlled object also means the limits of a corresponding at least one ACT for a corresponding controlled object, thus calculating the final yaw-rate controllable range of each of the controlled objects.

Then, the controllable range computer 5 is configured to supply the final yaw-rate controllable range of each of the controlled objects to each of the feedforward computer 6 and the feedback computer 7. Note that the application request of at least one application means a request of the at least one application including, in addition to the corresponding application request mode and the corresponding priority represented by the application information, the application request value for at least one control parameter of the at least one application.

In addition, the controllable range computer 5 is also configured to compute the total yaw-rate controllable range of all the controlled objects and the final yaw-rate controllable range for the total lateral-motion control of the controlled vehicle, and supply them to the control requester 1 as the controllable range information. As described above, each application of the control requester 1 is programmed to output a control request based on the controllable range information inputted from the availability computer 5. The detailed descriptions of a control request to be outputted from the control requester 1 will be described later.

Next, the detailed structure of the controlled object selector 61 (72) will be described hereinafter. FIG. 3 is a block diagram illustrating the detailed structure of the controlled object selector 61. Referring to FIG. 3, the controlled object selector 61 is comprised of a controllable range calculator 61a, a comparator 61b, and a selector 61c.

The controllable range calculator 61a is adapted to calculate the absolute quantity of the yaw rate $\gamma$ and the change $d\gamma/dt$ in the yaw rate $\gamma$ based on: the application request values for the control parameters (the yaw rate $\gamma$ and the change in the yaw rate $\gamma$), the application information, and each of the first final yaw-rate controllable range of the front-wheel steering, the second final yaw-rate controllable range of the rear-wheel steering, and the third final yaw-rate controllable range of the braking supplied from the controllable range computer 5.

Specifically, each of the first to third final yaw-rate controllable ranges represents the upper and lower limit of the absolute quantity of a corresponding controlled variable (the yaw rate), and the upper and lower limit of the change $d\gamma/dt$ in the corresponding controlled variable. Thus, the controllable range calculator 61a is adapted to create a map, as an example of data, indicative of the relationship between the controllable range of the absolute quantity of the yaw rate $\gamma$ and the controllable range of the change $d\gamma/dt$ in the yaw rate $\gamma$ for each of the controlled objects (the front-wheel steering, the rear-wheel steering, and the braking). Then, the controllable range calculator 61a is adapted to calculate, based on the map of each of the controlled objects, a value of the absolute quantity of the yaw rate $\gamma$ and a value of the change $d\gamma/dt$ in the yaw rate $\gamma$ according to the application request values and the application information.

Operations of the controllable range calculator 61 a set forth above will be fully described hereinafter with reference to FIGS. 4 and 5.

Figure 4A:
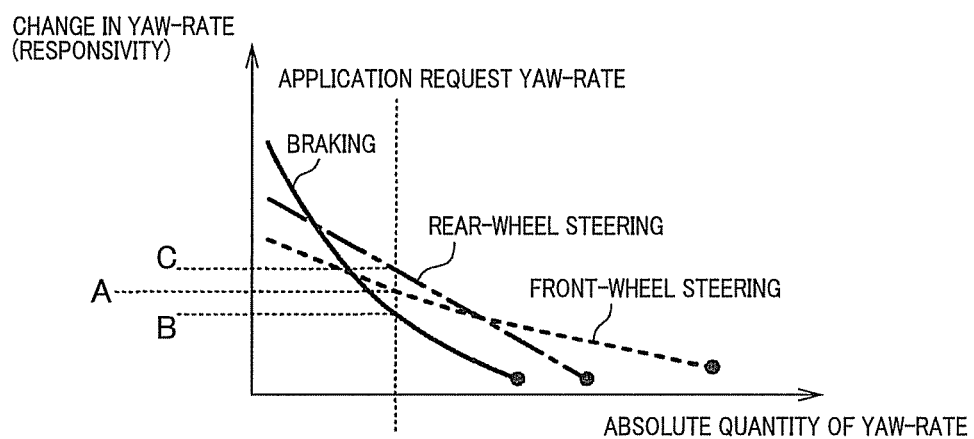
FIG. 4A is a graph schematically illustrating an example of a selected result by a controllable range calculator illustrated in FIG. 3 when an application request mode is set to a comfort mode.
Figure 4B:
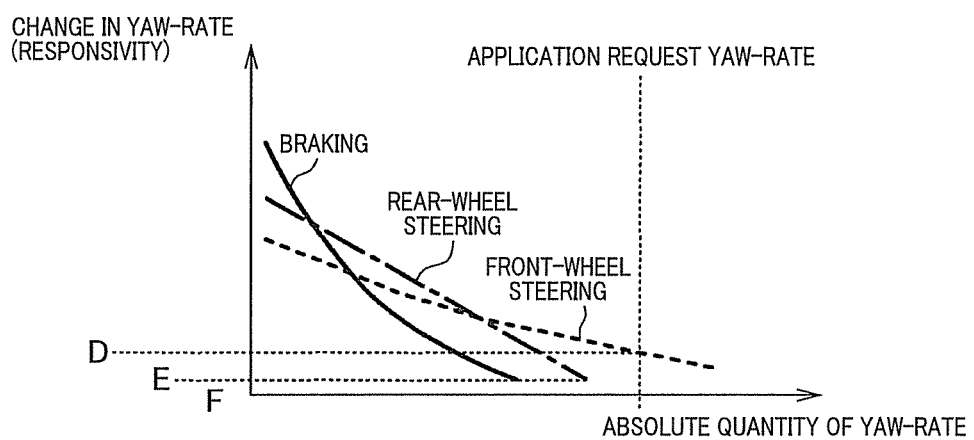
FIG. 4B is a graph schematically illustrating an alternative example of a selected result by the controllable range calculator when the application request mode is set to the comfort mode.

FIG. 4A illustrates an example of a selected result by the controllable range calculator 61a when the application request mode is set to the comfort mode; this selected result represents that an application-request yaw rate as one of the application request values can be implemented by control of each of the controlled objects. FIG. 4B illustrates an example of a selected result by the controllable range calculator 61a when the application request mode is set to the comfort mode; this selected result represents that an application-request yaw rate as one of the application request values can be implemented by control of a part of the controlled objects.

FIG. 5A illustrates an example of a selected result by the controllable range calculator 61a when the application request mode is set to the safety mode; this selected result represents that an application-request change in the yaw rate as one of the application request values can be implemented by control of each of the controlled objects. FIG. 5B illustrates an example of a selected result by the controllable range calculator 61a when the application request mode is set to the safety mode; this selected result represents that an application-request change in the yaw rate as one of the application request values can be implemented by control of a part of the controlled objects.

For example, in each of FIGS. 4A and 4B, the map indicative of the relationship between the controllable range of the absolute quantity of the yaw rate $\gamma$ and the controllable range of the change $d\gamma/dt$ in the yaw rate $\gamma$ for each of the controlled objects is illustrated in the form of a graph. Similarly, in each of FIGS. 5A and 5B, the map indicative of the relationship between the controllable range of the absolute quantity of the yaw rate $\gamma$ and the controllable range of the change $d\gamma/dt$ in the yaw rate $\gamma$ for each of the controlled objects is illustrated in the form of a graph.

If the application request mode is set to the comfort mode, it is preferable to fulfill the application request value with low responsivity and light load on the occupants in the controlled vehicle or with the number of the ACTs to be used being low. For this reason, the controllable range calculator 61a is operative to calculate, in the comfort mode, a value of the absolute quantity of the yaw rate $\gamma$ and a value of the change $d\gamma/dt$ in the yaw rate $\gamma$ relative to the application-request yaw rate.

In contrast, if the application request mode is set to the safety mode, it is preferable to fulfill the application request value with high responsivity because of the matter of emergency. For this reason, the controllable range calculator 61a is operative to calculate, in the safety mode, a value of the absolute quantity of the yaw rate $\gamma$ and a value of the change $d\gamma/dt$ in the yaw rate $\gamma$ relative to the application-request change in the yaw rate $\gamma$.

Specifically, referring to FIG. 4A, if the application request mode is set to the comfort mode, and the application-request yaw rate can be implemented by control of each of the controlled objects, in other words, the application-request yaw rate is smaller than the upper limit of the yaw rate $\gamma$ in the controllable range of each of the controlled objects, a value of the absolute quantity of the yaw rate $\gamma$ for each of the controlled objects is set to the application-request yaw rate. A value of the change in the yaw rate $\gamma$ for each of the controlled objects is set to a value at a point at which the graphed map of the controllable range of a corresponding one of the controlled objects intersects with the application-request yaw rate.

For example, in FIG. 4A, a value of the absolute quantity of the yaw rate $\gamma$ for the front-wheel steering is set to the application-request yaw rate, and a value of the change $d\gamma/dt$ in the yaw rate $\gamma$ for the front-wheel steering is set to a value at point A at which the graphed map of the controllable range of the front-wheel steering intersects with the application-request yaw rate. Similarly, a value the absolute quantity of the yaw rate $\gamma$ for the rear-wheel steering is set to the application-request yaw rate, and a value of the change $d\gamma/dt$ in the yaw rate $\gamma$ for the rear-wheel steering is set to a value at point C at which the graphed map of the controllable range of the rear-wheel steering intersects with the application-request yaw rate. In addition, a value of the absolute quantity of the yaw rate $\gamma$ for the braking is set to the application-request yaw rate, and a value of the change $d\gamma/dt$ in the yaw rate $\gamma$ for the braking is set to a value at point B at which the graphed map of the controllable range of the braking intersects with the application-request yaw rate.

On the other hand, referring to FIG. 4B, if the application request mode is set to the comfort mode, and the application-request yaw rate can be implemented by control of a part of the controlled objects, in other words, the application-request yaw rate is larger than the upper limit of the yaw rate $\gamma$ in the controllable range of a part of the controlled objects, a value of the absolute quantity of the yaw rate $\gamma$ for each of the controlled objects and a value of the change in the yaw rate $\gamma$ for each of the controlled objects are set as follows.

Specifically, referring to FIG. 4B, a value of the absolute quantity of the yaw rate $\gamma$ for the front-wheel steering, the upper limit of the yaw rate $\gamma$ in the controllable range of which is larger than the application-request yaw rate, is set to the application-request yaw rate. A value of the change in the yaw rate γ for the front-wheel steering is set to a value at a point at which the graphed map of the controllable range of the front-wheel steering intersects with the application-request yaw rate.

In contrast, a value of the absolute quantity of the yaw rate γ for each of the rear-wheel steering and the braking, the upper limit of the yaw rate γ in the controllable range of which is smaller than the application-request yaw rate, is set to the upper limit of the yaw rate in the controllable range of a corresponding one of the rear-wheel steering and the braking. A value of the change d γ/dt in the yaw rate γ for the rear-wheel steering is set to a value at a point E corresponding to the upper limit of the yaw rate γ in the controllable range of the rear-wheel steering. Similarly, a value of the change d γ/dt in the yaw rate γ for the braking is set to a value at a point F corresponding to the upper limit of the yaw rate γ in the controllable range of the braking. The value of the change d γ/dt in the yaw rate γ at the point E is equal to the value of the change d γ/dt in the yaw rate γ at the point F.

In addition, referring to FIG. 5A, if the application request mode is set to the safety mode, and the application-request change in the yaw rate γ can be implemented by control of each of the controlled objects, in other words, the application-request change in the yaw rate γ is smaller than the upper limit of the change in the yaw rate γ in the controllable range of each of the controlled objects, a value of the change in the yaw rate γ for each of the controlled objects is set to the application-request change in the yaw rate. A value of the absolute quantity of the yaw rate γ for each of the controlled objects is set to a value at a point at which the graphed map of the controllable range of a corresponding one of the controlled objects intersects with the application-request change in the yaw rate.

For example, in FIG. 5A, a value of the change d γ/dt in the yaw rate γ for the front-wheel steering is set to the application-request change in the yaw rate, and a value the absolute quantity of the yaw rate γ for the front-wheel steering is set to a value at point A at which the graphed map of the controllable range of the front-wheel steering intersects with the application-request change in the yaw rate. Similarly, a value of the change d γ/dt in the yaw rate γ for the rear-wheel steering is set to the application-request change in the yaw rate, and a value the absolute quantity of the yaw rate γ for the rear-wheel steering is set to a value at point C at which the graphed map of the controllable range of the rear-wheel steering intersects with the application-request change in the yaw rate. In addition, a value of the change d γ/dt in the yaw rate γ for the braking is set to the application-request change in the yaw rate, and a value the absolute quantity of the yaw rate γ for the braking is set to a value at point B at which the graphed map of the controllable range of the braking intersects with the application-request change in the yaw rate.

On the other hand, referring to FIG. 5B, if the application request mode is set to the safety mode, and the application-request change in the yaw rate can be implemented by control of a part of the controlled objects, in other words, the application-request change in the yaw rate is larger than the upper limit of the change in the yaw rate γ in the controllable range of a part of the controlled objects, a value of the absolute quantity of the yaw rate γ for each of the controlled objects and a value of the change in the yaw rate γ for each of the controlled objects are set as follows.

Specifically, referring to FIG. 5B, a value of the change d γ/dt in the yaw rate γ for the braking, the upper limit of the change in the yaw rate γ in the controllable range of which is larger than the application-request change in the yaw rate, is set to the application-request change in the yaw rate. A value of the absolute quantity of the yaw rate γ for the braking is set to a value at a point E at which the graphed map of the controllable range of the front-wheel steering intersects with the application-request change in the yaw rate.

In contrast, a value of the change d γ/dt in the yaw rate γ for each of the front-wheel steering and the rear-wheel steering, the upper limit of the change in the yaw rate γ in the controllable range of which is smaller than the application-request change in the yaw rate, is set to the upper limit of the change in the yaw rate γ in the controllable range of a corresponding one of the front-wheel steering and the rear-wheel steering. A value of the absolute quantity of the yaw rate γ for the front-wheel steering is set to a value at point D corresponding to the upper limit of the change in the yaw rate γ in the controllable range of the front-wheel steering. Similarly, a value of the absolute quantity of the yaw rate γ for the rear-wheel steering is set to a value at point F corresponding to the upper limit of the change in the yaw rate γ in the controllable range of the rear-wheel steering. The value of the absolute quantity of the yaw rate γ at the point D is equal to the value of the absolute quantity of the yaw rate γ at the point F.

The comparator 61b is adapted to compare the application request values for each of the controlled objects, that is, the application-request yaw rate and the application-request change in the yaw rate for each of the control parameters with the respective value of the absolute quantity of the yaw rate γ and a value of the change d γ/dt in the yaw rate γ for a corresponding one of the controlled objects calculated by the controllable range calculator 61a. Specifically, the comparator 61b compares in magnitude a value of the absolute quantity of the yaw rate γ and a value of the change d γ/dt in the yaw rate γ for each of the controlled objects with the respective application request values for a corresponding one of the control parameters, thus determining whether control of each of the controlled objects can satisfy the respective application request values for a corresponding one of the control parameter.

For example, it is assumed that there is a value of the application-request yaw rate is 5, and values of the absolute quantity of the yaw rate γ for the front-wheel steering, the rear-wheel steering, and the braking are respectively calculated as 8, 6, 3. In this assumption, control of each of the front-wheel steering and the rear-wheel steering can satisfy the application-request yaw rate, but control of the braking cannot satisfy the application-request yaw rate. In addition, it is assumed that there is a value of the application-request change in the yaw rate is 3, and values of the change d γ/dt in the yaw rate γ for the front-wheel steering, the rear-wheel steering, and the braking are respectively calculated as 5, 6, 7. In this assumption, control of any of the front-wheel steering, rear-wheel steering, and braking can satisfy the application-request change in the yaw rate.

That is, the comparator 61b is adapted to:

compare the application-request yaw rate for each of the controlled objects with the value of the absolute quantity of the yaw rate γ of a corresponding one of the controlled objects;

output a result of the comparison as a first comparison result;

compare the application-request change in the yaw rate for each of the controlled objects with the value of the change d γ/dt in the yaw rate γ of a corresponding one of the controlled objects; and output a result of the comparison as a second comparison result.

The selector 61c is adapted to select at least one of the controlled objects as a selected controlled object based on a result of the comparison by the comparator 61b.

In this embodiment, the selector 61c selects one of the controlled objects as a selected controlled object so as to fulfill the application-request values according to the selected application request mode. Specifically, the selector 61c selects, as a first controlled object, one of the controlled objects; the one of the controlled objects has the highest priority to be selected. If control of the first controlled object cannot satisfy the application-request values according to the selected application request mode, the selector 61c selects, as a second controlled object, one of the remaining controlled objects. If control of the second controlled object cannot satisfy the application-request values according to the selected application request mode, the selector 61c selects, as a third controlled object, the last controlled object. The selector 61c changes the order of selection of the controlled objects according to the selected application request mode.

Figure 6A:
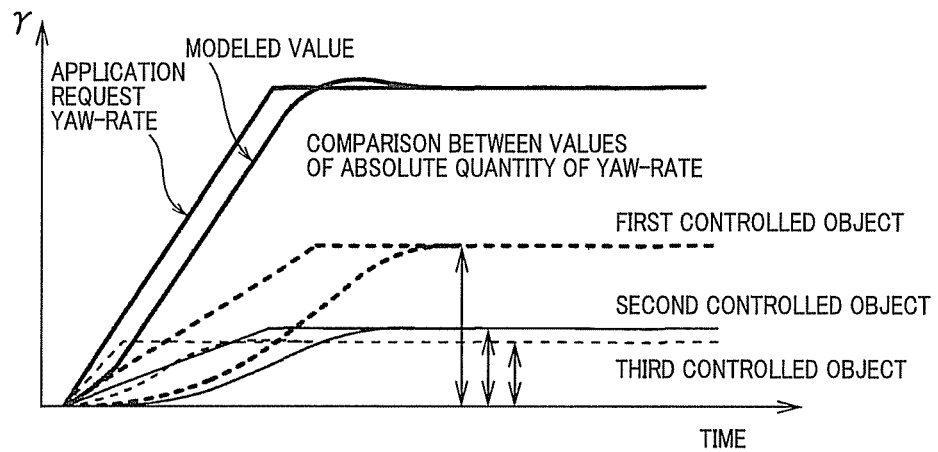
FIG. 6A is a graph schematically illustrating one example of the order of selection of a plurality of controlled objects if a selected application request mode is the comfort mode.
Figure 6B:
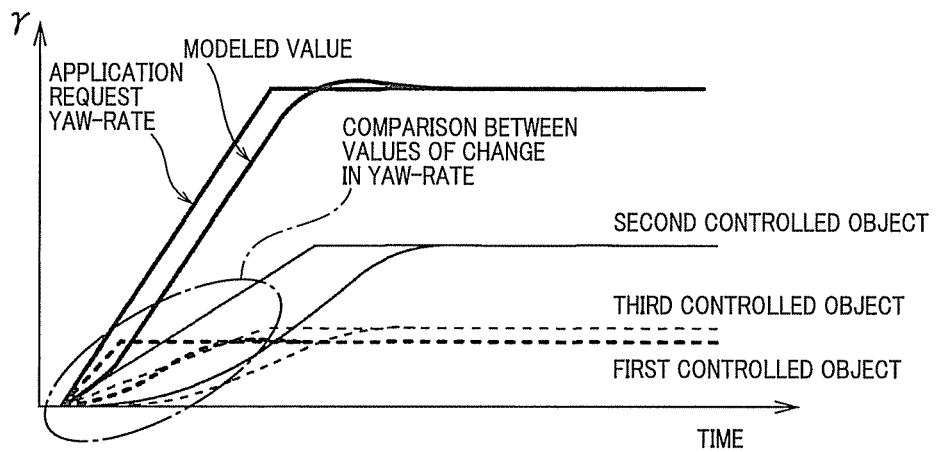
FIG. 6B is a graph schematically illustrating one example of the order of selection of the plurality of controlled objects if the selected application request mode is the safety mode.

How to determine the order of selection of the controlled objects by the selector 61c will be fully described with reference to FIGS. 6A and 6B. FIG. 6A schematically illustrates one example of the order of selection of the controlled objects if the selected application request mode is the comfort mode, and FIG. 6B schematically illustrates one example of the order of selection of the controlled objects if the selected application request mode is the safety mode. Referring to FIGS. 6A and 6B, a modeled value is determined for the application-request yaw rate, and selection of one of the controlled objects is performed to satisfy the modeled value.

If the comfort mode is selected as the application request mode, the controlled objects are successively selected in descending order of their values of the absolute quantity of the yaw rate γ as the first to third controlled objects because high responsivity is not needed in the comfort mode according to a result of comparison between the values of the absolute quantity of the yaw rate γ of the first to third controlled objects (see FIG. 6A). This can select the controlled objects to be used to control lateral motions of the controlled vehicle in descending order of their values of the absolute quantity of the yaw rate γ, making it possible to perform control of lateral motions of the controlled vehicle with fewer controlled objects. This reduces oscillation quantity of lateral motions of the controlled vehicle due to interference of controlled objects, increasing occupant comfort as compared to the case where there are many unnecessary controlled objects to be used to control lateral motions of the controlled vehicle.

On the other hand, if the safety mode is selected as the application request mode, the controlled objects are successively selected in descending order of their values of the change (gradient) d γ/dt in the yaw rate γ as the first to third controlled objects because high responsivity is needed in the safety mode according to a result of comparison between the values of the change in the absolute quantity of the yaw rate γ of the first to third controlled objects (see FIG. 6B). This makes it possible to perform control of lateral motions of the controlled vehicle with higher responsivity so as to place greater importance on safety of the controlled vehicle than occupant comfort. However, if a value of the change d γ/dt in the yaw rate γ of a controlled object is high with a low value of the absolute quantity of the yaw rate γ of the controlled object, the selector 61c can be adapted to change the order of the controlled object to be selected, thus meeting urgency. For example, if a value of the change d γ/dt in the yaw rate γ of a controlled object is high whereas a value of the absolute quantity of the yaw rate γ of the controlled object is equal to or lower than a preset percentage of the application-request yaw rate, the selector 61c can be adapted to reduce the order of the controlled object to be selected.

Examples of specific operations of the selector 61c for selection of the first to third controlled objects will be described hereinafter with reference to FIGS. 7A to 7C and 8A to 8C. FIGS. 7A to 7C illustrate maps to be used for selection of the first to third controlled objects in the comport mode as the application request mode, and FIGS. 8A to 8C illustrate maps to be used for selection of the first to third controlled objects in the safety mode as the application request mode. Specifically, each of FIGS. 7A and 8A illustrates a map for selection of the first controlled object having the highest priority in the controlled objects, and each of FIGS. 7B and 8B illustrates a map for selection of the second controlled object having the next higher priority in the controlled objects. Each of FIGS. 7C and 8C illustrates a map for selection of the third controlled object having the third higher priority in the controlled objects. These maps are stored in, for example, the selector 61c. In FIGS. 7A to 7C and 8A to 8C, each of the maps has a table format, but can have any of various data formats.

Each of the maps illustrated in FIGS. 7A to 7C represents a relationship between the variable of comparison results of the application-request yaw rate for each of the controlled objects with the value of the absolute quantity of the yaw rate γ of a corresponding one of the controlled objects, the variable of comparison results of the application-request change in the yaw rate for each of the controlled objects with the value of the change in the yaw rate γ of a corresponding one of the controlled objects, and the variable of a controlled object to be selected as the first controlled object.

For example, in FIG. 7A, eight columns of the table represent all pieces of information to be outputted as the first comparison result from the comparator 61b.

If the first comparison result represents that control of each of the controlled objects cannot satisfy the application-request yaw rate, the first column "0: ALL UNFULFILLMENT" is selected. If the first comparison result represents that control of the front-wheel steering can only satisfy the application-request yaw rate, the second column "1: FRONT-WHEEL STEERING" is selected. If the first comparison result represents that control of the braking can only satisfy the application-request yaw rate, the third column "2: BRAKING" is selected, or that control of the rear-wheel steering can only satisfy the application-request yaw rate, the fourth column "4: "REAR-WHEEL STEERING" is selected.

If the first comparison result represents that control of each of the front-wheel steering and the braking can satisfy the application-request yaw rate, the fifth column "3: FRONT-WHEEL STEERING OR BRAKING" is selected. If the first comparison result represents that control of each of the rear-wheel steering and the front-wheel steering can satisfy the application-request yaw rate, the sixth column "5: REAR-WHEEL STEERING OR FRONT-WHEEL STEERING" is selected, or that control of each of the rear-wheel steering and the braking can satisfy the application-request yaw rate, the seventh column "6: REAR-WHEEL STEERING OR BRAKING" is selected. If the first comparison result represents that control of any of the front-wheel steering, rear-wheel steering, and braking can satisfy the application-request yaw rate, the eighth column "7: ALL FULFILLMENT" is selected.

Similarly, eight rows of the table represent all pieces of information to be outputted as the second comparison result from the comparator 61b.

If the second comparison result represents that control of each of the controlled objects cannot satisfy the application-request change in the yaw rate, the first row "0: ALL UNFUL- FILLMENT" is selected. If the second comparison result represents that control of the front-wheel steering can only satisfy the application-request change in the yaw rate, the second row "1: FRONT-WHEEL STEERING" is selected. If the second comparison result represents that control of the braking can only satisfy the application-request change in the yaw rate, the third row "2: BRAKING" is selected, or that control of the rear-wheel steering can only satisfy the application-request change in the yaw rate, the fourth row "4: REAR-WHEEL STEERING" is selected.

If the second comparison result represents that control of each of the front-wheel steering and the braking can satisfy the application-request change in the yaw rate, the fifth row "3: FRONT-WHEEL STEERING OR BRAKING" is selected. If the second comparison result represents that control of each of the rear-wheel steering and the front-wheel steering can satisfy the application-request change in the yaw rate, the sixth row "5: REAR-WHEEL STEERING OR FRONT-WHEEL STEERING" is selected, or that control of each of the rear-wheel steering and the braking can satisfy the application-request change in the yaw rate, the seventh row "6: REAR-WHEEL STEERING OR BRAKING" is selected. If the second comparison result represents that control of any of the front-wheel steering, rear-wheel steering, and braking can satisfy the application-request change in the yaw rate, the eighth row "7: ALL FULFILLMENT" is selected.

Information indicative of any of the controlled objects to be selected as the first controlled object is determined at a field in the map at which each column intersects with a corresponding row. For example, information "SELECTION OF MAXIMUM CHANGE" at a field in the map illustrated in FIG. 7A at which each of the columns intersects with the first row represents selection of one of the front-wheel steering, rear-wheel steering, and braking as the first controlled object, the one of the front-wheel steering, rear-wheel steering, and braking has the maximum value of the change $d\gamma/dt$ in the yaw rate $\gamma$ in all the values of the change $d\gamma/dt$ in the yaw rate $\gamma$ of the front-wheel steering, rear-wheel steering, and braking.

First, specific operations of the selector 61c for selection of the first to third controlled objects if the comfort mode is selected as the application request mode.

In order to simply describe the specific operations of the selector 61c, it is assumed that the first comparison result of the comparator 61b represents that control of each of the front-wheel steering and the rear-wheel steering can satisfy the application-request yaw rate, and the second comparison result represents that control of any of the front-wheel steering, rear-wheel steering, and braking can satisfy the application-request change in the yaw rate.

In order to select the first controlled object, the selector 61c selects the sixth column "5: REAR-WHEEL STEERING OR FRONT-WHEEL STEERING" corresponding to the first comparison result in the eight columns of the map illustrated in FIG. 7A. Next, the selector 61c selects the eighth row "7: ALL FULFILLMENT" corresponding to the second comparison result in the eight rows of the map illustrated in FIG. 7A. Then, the selector 61c selects information at the field in the map illustrated in FIG. 7A at which the selected sixth column intersects with the selected eighth row; this information represents "6: BRAKING OR REAR-WHEEL STEERING WITH HIGHER VALUE". That is, the selector 61c selects, as the first controlled object, one of the braking and the rear-wheel steering; the one of the braking and the rear-wheel steering has the value of the absolute quantity of the yaw rate $\gamma$ is higher than that of the other thereof.

Next, in order to select the second controlled object, the selector 61c selects the sixth column "5 REAR-WHEEL STEERING OR FRONT-WHEEL STEERING" corresponding to the first comparison result in the eight columns of the map illustrated in FIG. 7B. Next, the selector 61c selects the eighth row "7: ALL FULFILLMENT" corresponding to the second comparison result in the eight rows of the map illustrated in FIG. 7B. Then, the selector 61c selects information at the field in the map illustrated in FIG. 7B at which the selected sixth column intersects with the selected eighth row; this information represents "NO SECOND CONTROLLED OBJECT". That is, the selector 61c selects, as the second controlled object, none of the front-wheel steering, rear-wheel steering, and braking.

Note that, in the map illustrated in FIG. 7B, information "5 SELECTION OF MAXIMUM VALUE" at, for example, the field in the map at which the first column intersects with the second row represents information instructing the selector 61c to select, as the second controlled object, one of the controlled objects having the maximum value of the absolute quantity of the yaw rate $\gamma$ in all the values of the absolute quantity of the yaw rate $\gamma$ of the controlled objects. In the map illustrated in FIG. 7B, infatuation "6 SELECTION OF MAXIMUM VALUE EXCEPT FOR FIRST" at, for example, the field in the map at which the first column intersects with the fourth row represents information instructing the selector 61c to select, as the second controlled object, one of the remaining controlled objects having the maximum value of the absolute quantity of the yaw rate $\gamma$ in all the values of the absolute quantity of the yaw rate $\gamma$ of the remaining controlled objects.

In the map illustrated in FIG. 7B, information "4 SELECTION OF SECOND CHANGE" at, for example, the field in the map at which the first column intersects with the first row represents information instructing the selector 61c to select, as the second controlled object, one of the controlled objects having the next higher value of the change $d\gamma/dt$ in the yaw rate $\gamma$ in all the values of the controlled objects.

Next, in order to select the third controlled object, the selector 61c selects the sixth column "5: REAR-WHEEL STEERING OR FRONT-WHEEL STEERING" corresponding to the first comparison result in the eight columns of the map illustrated in FIG. 7C. Next, the selector 61c selects the eighth row "7: ALL FULFILLMENT" corresponding to the second comparison result in the eight rows of the map illustrated in FIG. 7C. Then, the selector 61c selects information at a field in the map illustrated in FIG. 7C at which the selected sixth column intersects with the selected eighth row; this information represents "NO SECOND CONTROLLED OBJECT". That is, the selector 61c selects, as the third controlled object, none of the front-wheel steering, rear-wheel steering, and braking.

Note that, in the map illustrated in FIG. 7C, information "THIRD CONTROLLED OBJECT FOR YAW RATE" at, for example, the field in the map at which the first column intersects with the second row represents information instructing the selector 61c to select, as the third controlled object, the controlled object with the minimum value of the absolute quantity of the yaw rate $\gamma$ in the values of the absolute quantity of the yaw rate $\gamma$ of all the controlled objects in order to assist the absolute quantity of the yaw rate $\gamma$. In the map illustrated in FIG. 7C, information "THIRD CONTROLLED OBJECT FOR CHANGE IN YAW RATE" at, for example, the field in the map at which the each column intersects with the first row represents information instructing the selector 61c to select, as the third controlled object, the controlled object with the minimum value of the change $d\gamma/dt$ in the yaw rate $\gamma$ in the values of the change d γ/dt in the yaw rate γ of all the controlled objects in order to assist a value of the change d γ/dt in the yaw rate γ.

How to determine the order of the first to third controlled objects using the maps illustrated in FIGS. 7A to 7C if the comfort mode is selected as the application request mode has been described in detail. How to determine the order of the first to third controlled objects using the maps illustrated in FIGS. 8A to 8C if the safety mode is selected as the application request mode is substantially identical to that using the maps illustrated in FIGS. 7A to 7C except that the maps illustrated in FIGS. 7A to 7C to be used are changed to the maps illustrated in FIGS. 8A to 8C. Thus, descriptions of how to determine the order of the first to third controlled objects using the maps illustrated in FIGS. 8A to 8C are omitted.

Note that, information "SELECTION OF MAXIMUM VALUE" at a field in the map illustrated in FIG. 8A at which each of the columns intersects with the first row represents selection of one of the front-wheel steering, rear-wheel steering, and braking as the first controlled object, the one of the front-wheel steering, rear-wheel steering, and braking has the maximum value of the absolute quantity of the yaw rate γ in all the values of the absolute quantity of the yaw rate γ of the front-wheel steering, rear-wheel steering, and braking.

Information "FRONT-WHEEL STEERING (REAR-WHEEL STEERING) OR BRAKING WITH HIGHER CHANGE" at a field in the map illustrated in FIG. 8A represents selection of one of the front-wheel steering (rear-wheel steering) and the braking; the one of the front-wheel steering (rear-wheel steering) and the braking has a value of the change in the yaw rate γ is higher than that of the other thereof. Information "FRONT-WHEEL STEERING OR REAR-WHEEL STEERING WITH HIGHER CHANGE" at a field in the map illustrated in FIG. 8A is similar to the Information "FRONT-WHEEL STEERING (REAR-WHEEL STEERING) OR BRAKING WITH HIGHER CHANGE".

Note that, in the map illustrated in FIG. 8B, information "5 SELECTION OF MAXIMUM CHANGE" at, for example, the field in the map at which the first column intersects with the second row represents information instructing the selector 61c to select, as the second controlled object, one of the controlled objects having the maximum value of the change in the yaw rate γ in all the values of the change in the yaw rate γ of the controlled objects. In the map illustrated in FIG. 8B, information "6 SELECTION OF MAXIMUM CHANGE EXCEPT FOR FIRST" at, for example, the field in the map at which the first column intersects with the fourth row represents information instructing the selector 61c to select, as the second controlled object, one of the remaining controlled objects having the maximum value of the change in the yaw rate γ in all the values of the change in the yaw rate γ of the remaining controlled objects.

In the map illustrated in FIG. 8B, information "4 SELECTION OF SECOND VALUE" at, for example, the field in the map at which the first column intersects with the first row represents information instructing the selector 61c to select, as the second controlled object, one of the controlled objects having the next higher value of the absolute quantity of the yaw rate γ in all the values of the controlled objects.

Note that, in the map illustrated in FIG. 8C, information "THIRD CONTROLLED OBJECT FOR CHANGE IN YAW RATE" at, for example, the field in the map at which the first column intersects with the second row represents information instructing the selector 61c to select, as the third controlled object, the controlled object with the minimum value of the change in the yaw rate γ in the values of the change in the yaw rate γ of all the controlled objects in order to assist a value of the change d γ/dt in the yaw rate γ. In the map illustrated in FIG. 8C, information "THIRD CONTROLLED OBJECT FOR YAW RATE" at, for example, the field in the map at which the each column intersects with the first row represents information instructing the selector 61c to select, as the third controlled object, the controlled object with the minimum value of the absolute quantity of the yaw rate γ in the values of the absolute quantity of the yaw rate γ of all the controlled objects in order to assist a value of the absolute quantity of the yaw rate γ.

The maps illustrated in FIGS. 7A to 7C are basically designed such that the controlled objects are selected successively in descending order of their values of the absolute quantity of the yaw rate γ. That is, the maps illustrated in FIGS. 7A to 7C are basically designed such that a controlled object, which is determined to be optimum to meet the application request values, is only selected without selection of all of the controlled objects.

If a controlled object completely fulfills the application-request yaw rate and the application-request change in the yaw rate, the controlled object is only selected as a selected controlled object. If some controlled objects completely fulfill the application-request yaw rate, one of these controlled objects is selected as a selected controlled object based on the values of the application-request change in the yaw rate of these controlled objects. If each of the controlled objects fulfills the application-request yaw rate, but none of the controlled objects fulfills the application-request change in the yaw rate, a controlled object whose value of the change d γ/dt in the yaw rate γ is the highest in the values of the change d γ/dt in the yaw rate γ of all the controlled objects is selected as a selected controlled object. This can reduce the number of controlled objects to be selected.

In contrast, the maps illustrated in FIGS. 8A to 8C are basically designed such that the controlled objects are selected successively in descending order of their values of the change d γ/dt in the yaw rate γ. That is, the maps illustrated in FIGS. 8A to 8C are basically designed such that a controlled object, which is determined to be optimum to meet the application request values, is only selected without selection of all of the controlled objects.

If a controlled object completely fulfills the application-request yaw rate and the application-request change in the yaw rate, the controlled object is only selected as a selected controlled object. If some controlled objects completely fulfill the application-request change in the yaw rate, one of these controlled objects is selected as a selected controlled object based on the values of the application-request yaw rate of these controlled objects. If each of the controlled objects fulfills the application-request change in the yaw rate, but none of the controlled objects fulfills the application-request yaw rate, a controlled object whose value of the absolute quantity of the yaw rate γ is the highest in the values of the absolute quantity of all the controlled objects is selected as a selected controlled object. This can reduce the number of controlled objects to be selected.

After completion of selection of at least one controlled object by the controlled object selector 61, the modeled-value computer 62 computes at least one modeled value for the at least one selected controlled object based on, for example, the application-request yaw rate, the application-request change in the yaw rate, and the controllable range of the at least one selected controlled object.

The feedforward request computer 63 computes a feedforward request value for the absolute quantity of the yaw rate γ in the at least one selected controlled object based on the difference between the at least one modeled value for the at least one selected controlled object and the application-request yaw rate.

In this embodiment, as described above, at least one of the first F/F request value for the front-wheel steering, the second F/F request value for the rear-wheel steering, and the third F/F request value for the braking is outputted from the F/F computer 6 to the determiner 8.

As well as the controlled object selector 61, the controlled object selector 72 of the feedback computer 7 selects at least one controlled object to be used to perform lateral-motion control of the controlled vehicle. The second feedback request computer 73 computes a local feedback request value for the at least one selected controlled object. The local feedback request value for the at least one selected controlled object is outputted from the second feedback request computer 73 to the determiner 8.

In this embodiment, as described above, at least one of the first F/B request value for the front-wheel steering, the second F/B request value for the rear-wheel steering, and the third F/B request value for the braking is outputted from the F/B computer 7 to the determiner 8.

Based on the at least one of the first F/F request value for the front-wheel steering, the second F/F request value for the rear-wheel steering, and the third F/F request value for the braking and the at least one of the first F/B request value for the front-wheel steering, the second F/B request value for the rear-wheel steering, and the third F/B request value for the braking, a commanded value of at least one controlled object is outputted to a corresponding at least one of the ECUs 12 to 14 via the determiner 8 and a corresponding at least one of the managers 9 to 11. The corresponding at least one of the ECUs 12 to 14 activates a corresponding at least one of the ACTs 16 to 19 based on the commanded value of the corresponding at least one controlled objects, thus implementing lateral-motion control of the controlled vehicle according to the request of at least one application.

As described above, the lateral-motion control system according to this embodiment is capable of optimally determining, based on the controllable range of at least one control parameter (a controlled variable and a change therein in this embodiment) for at least one of the controlled objects, at least one of the ACTs 16 to 19 to be activated, and optimally determining a value of the at least control parameter by the activated at least one of the ACTs 16 to 19.

Next, the application request (control request) to be generated and outputted from each application will be described in detail hereinafter.

The controllable range information supplied from the controllable range computer 5 to each application of the control requester 1 includes at least the total yaw-rate controllable range of all the controlled objects and the final yaw-rate controllable range for the total lateral-motion control of the controlled vehicle.

As described above, the final yaw-rate controllable range for the total lateral-motion control of the controlled vehicle is a function of the absolute quantity of the yaw rate γ and the change d γ/dt in the yaw rate γ. Thus, the control requester 1 is adapted to create, as a map, the final yaw-rate controllable range for the total lateral-motion control of the controlled vehicle as a function of the absolute quantity of the yaw rate γ and the change d γ/dt in the yaw rate γ (see FIG. 9).

As described above, the total yaw-rate controllable range of all the controlled objects is limited by the application-requested limitation and limitation on the vehicle information so that the map illustrated in FIG. 9 is obtained. For example, even if the total yaw-rate controllable range of all the controlled objects is corrected based on the application-requested limitation, it is impossible to generate a value of a controlled variable for lateral-motion control in the braking out of a friction circle defined by total grip of the tires of the controlled vehicle.

That is, the total yaw-rate controllable range of all the controlled objects is corrected by the application-requested limitation and limitation on the vehicle information so that the final yaw-rate controllable range for the total lateral-motion control of the controlled vehicle is obtained as the map illustrated in FIG. 9.

Each application stored in the control requester 1 is programmed to output a control request based on the final yaw-rate controllable range for the total lateral-motion control of the controlled vehicle illustrated in FIG. 9 as the map.

Figure 10:
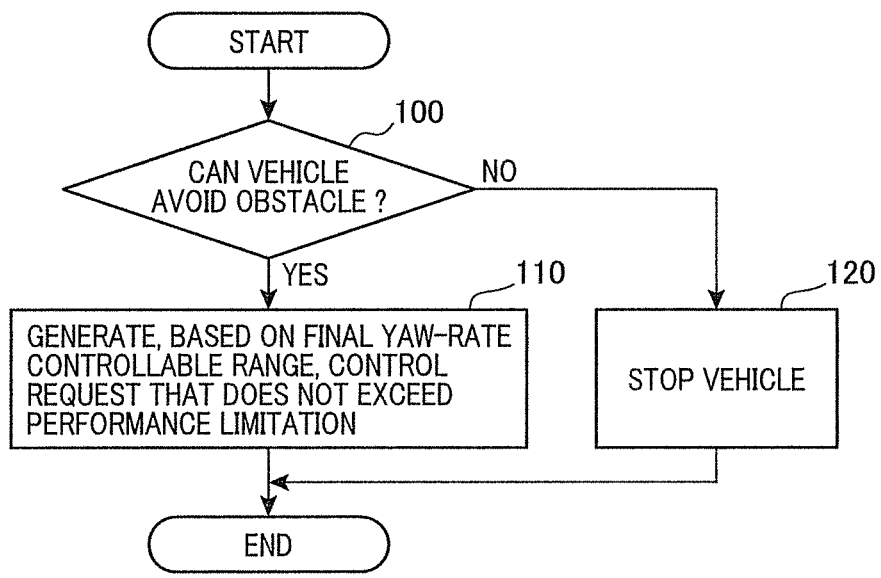
FIG. 10 is a flowchart schematically illustrating the behavior of an emergency avoidance application as an example of a plurality of applications stored in a control requester illustrated in FIG. 1.

Next, the behavior of the emergency avoidance application as an example of the applications stored in the control requester 1 for outputting a control request will be described with reference to FIG. 10. The emergency avoidance application is launched when at least one common start condition is met and performed every preset control cycle. For example, the at least one common start condition is a condition that at least one obstacle is detected by a sensor (not shown) along the travel track of the controlled vehicle. The sensor is adapted to measure the distance between the controlled vehicle and the detected at least one obstacle.

When the emergency avoidance application is launched, the emergency avoidance application is programmed to determine whether the controlled vehicle can avoid the detected at least one obstacle in step 100.

For example, in step 100, the emergency avoidance application is programmed to determine that the controlled vehicle can avoid the detected at least one obstacle when it is predicted that, if the controlled vehicle continues to travel to the current direction of travel at the current speed, there will be no collision between the controlled vehicle and the detected at least one obstacle or time taken for the controlled vehicle to collide with the detected at least one obstacle will be equal to or longer than a preset threshold. Otherwise, in step 100, the emergency avoidance application is programmed to determine that the controlled vehicle cannot avoid the detected at least one obstacle when it is predicted that, if the controlled vehicle continues to travel to the current direction of travel at the current speed, there will be a collision between the controlled vehicle and the detected at least one obstacle or time taken for the controlled vehicle to collide with the detected at least one obstacle will be shorter than the preset threshold.

Specifically, if it is determined that the controlled vehicle can avoid the detected at least one obstacle (YES in step 100), the emergency avoidance application is programmed to proceed to step 110, and generate, based on the final yaw-rate controllable range for the total lateral-motion control of the controlled vehicle, a control request including a request positive/negative lateral acceleration Gy and a request change dGy/dt in the lateral acceleration Gy does not exceed performance limitations to be achieved by the total lateral-motion control of the controlled vehicle.

Figure 11:
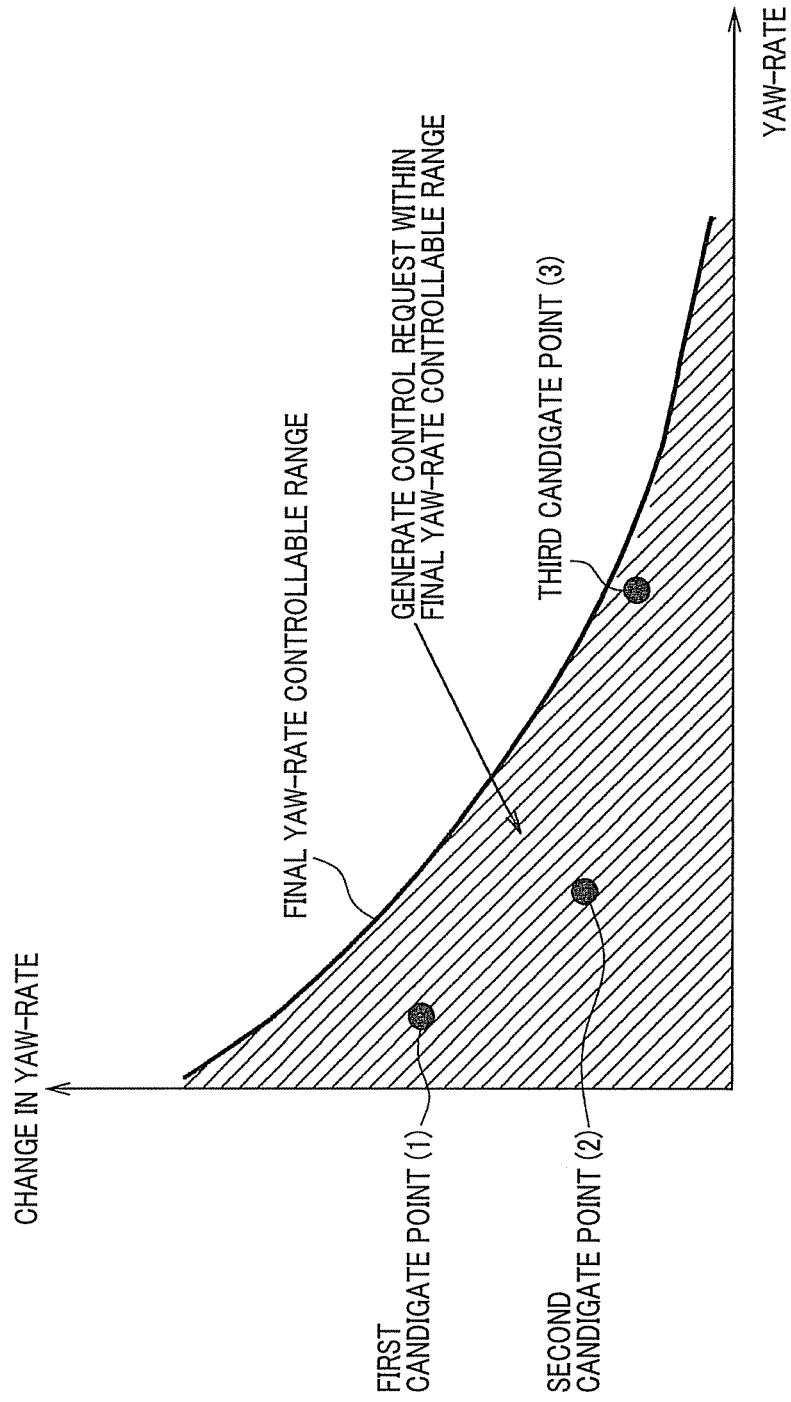
FIG. 11 is a graph schematically illustrating, as a map, a final yaw-rate controllable range for total lateral-motion control of a controlled vehicle within which a plurality of candidate points are set.

For example, the final yaw-rate controllable range for the total lateral-motion control of the controlled vehicle is illustrated as a map in FIG. 11. In step 111, the emergency avoidance application is programmed to generate a plurality of candidates (candidate points) within the map; each of the candidate points consists of a set of a request yaw rate and a request change in the yaw rate corresponding to the set of the request positive/negative lateral acceleration Gy and the request change dGy/dt in the lateral acceleration Gy. Specifically, in FIG. 11, the emergency avoidance application is programmed to generate, as the plurality of candidate points, a first candidate point (1), a second candidate point (2), and a third candidate point (3) within the final yaw-rate controllable range for the total lateral-motion control of the controlled vehicle.

In step 111, the emergency avoidance application is programmed to select one of the plurality of candidate points based on the application request mode inputted to the control requester 1 as part of the application information; the selected candidate point is most suitable for the priority of the request mode.

For example, as illustrated in FIG. 11, a value of the request change in the yaw rate of the first candidate point (1) is higher than a value of the request change in the yaw rate of each of the second and third candidate points (2) and (3). The value of the request change in the yaw rate of the second candidate point (2) is higher than the value of the request change in the yaw rate of the third candidate point (3), and lower than the value of the request change in the yaw rate of the first candidate point (1).

Similarly, a value of the request yaw rate of the third candidate point (3) is higher than a value of the request yaw rate of each of the first and second candidate points (1) and (2). The value of the request yaw rate of the second candidate point (2) is lower than the value of the request yaw rate of the third candidate point (3), and higher than the value of the request change in the yaw rate of the first candidate point (1).

If the application request mode is set to the safety mode, which places a higher priority on emergency than comfort, the emergency avoidance application is programmed to select the first candidate point (1) because the value of the request change in the yaw rate of the first candidate point (1) is higher than any of the values of the request change in the yaw rate of the second and third candidate points (2) and (3). If the application request mode is set to place a higher priority on both the comfort and urgency, the emergency avoidance application is programmed to select the second candidate point (2).

In addition, in step 111, if the final yaw-rate controllable range for the total lateral-motion control of the controlled vehicle in its right-hand turn is different from the final yaw-rate controllable range for the total lateral-motion control of the controlled vehicle in its left-hand turn, the emergency avoidance program can be programmed to select one of the final yaw-rate controllable range for the total lateral-motion control of the controlled vehicle in its right-hand turn and the final yaw-rate controllable range for the total lateral-motion control of the controlled vehicle in its left-hand turn; the selected one of the final yaw-rate controllable range for the total lateral-motion control of the controlled vehicle in its right-hand turn and the final yaw-rate controllable range for the total lateral-motion control of the controlled vehicle in its left-hand turn is greater than the other thereof. Then, in step 111, the emergency avoidance program can be programmed to select one of a plurality of candidate points within the selected one of the final yaw-rate controllable range for the total lateral-motion control of the controlled vehicle in its right-hand turn and the final yaw-rate controllable range for the total lateral-motion control of the controlled vehicle in its left-hand turn.

Thereafter, in step 111, the emergency avoidance program is programmed to output the request yaw rate (request positive/negative lateral acceleration Gy) and the request change in the yaw rate (request change dGy/dt in the lateral acceleration Gy) of the selected candidate point to the target value generator 3.

Otherwise, if it is determined that the controlled vehicle cannot avoid the detected at least one obstacle (NO in step 100), the emergency avoidance application is programmed to proceed to step 120, and generate a control request instructing stop of the controlled vehicle, thus outputting, to the target value generator 3, the control request in step S120. Based on the control request for instructing stop of the controlled vehicle, breaking torque for the braking is generated by the ESC-ACT 19 or a brake actuator for each wheel so that the controlled vehicle is stopped.

That is, the emergency avoidance application is programmed to avoid a collision of the controlled vehicle with at least one obstacle if it is determined that the controlled vehicle will collide with the at least one obstacle although it outputs an application request having a set of a request yaw rate and a request change in the yaw rate being within the final yaw-rate controllable range for the total lateral-motion control of the controlled vehicle to thereby perform lateral-motion control of the controlled vehicle.

As described above, the lateral-motion control system is configured to transfer the final yaw-rate controllable range for the total lateral-motion control of the controlled vehicle to each application stored in the control requester 1. This transfer allows each application to generate, based on the final yaw-rate controllable range for the total lateral-motion control of the controlled vehicle, a control request (an application request) such that the control request does not exceed performance limitations to be achieved by the total lateral-motion control of the controlled vehicle. Thus, it is possible to control lateral motions of the controlled vehicle more suitable for the final yaw-rate controllable range for the total lateral-motion control of the controlled vehicle.

Note that the controllable range computer 5 according to this embodiment is configured to transfer the total yaw-rate controllable range of all the controlled objects to the control requester 1 in addition to the final yaw-rate controllable range for the total lateral-motion control of the controlled vehicle. This configuration allows each application to determine any of the final yaw-rate controllable range for the total lateral-motion control of the controlled vehicle and the total yaw-rate controllable range of all the controlled objects to be used for generation of a control request. Thus, it is possible to control lateral motion of the controlled vehicle to suit any of the final yaw-rate controllable range for the total lateral-motion control of the controlled vehicle and the total yaw-rate controllable range of all the controlled objects.

It follows from what has been described that the lateral-motion control apparatus according to this embodiment is configured to control the plurality of different controlled objects to perform lateral-motion control of the controlled vehicle, thus achieving the application request values for at least one control parameter for each of the controlled objects.

In performing the lateral-motion control of the controlled vehicle, the lateral-motion control apparatus is configured to obtain the controllable range of the at least one control parameter for each of the controlled objects, and determine, based on the controllable range of the at least one control parameter for each of the controlled objects, the priorities of the controlled objects, thus determining a selected controlled object according to the priorities of the controlled objects. For example, the at least one control parameter includes a controlled variable and a change in the controlled variable, and the controllable range of the at least one control parameter includes at least the upper limit of the controlled variable and the upper limit of the change in the controlled variable.

Determination of the priorities of the controlled objects according to the controllable range of the at least one control parameter for each of the controlled objects makes it possible to accurately select a controlled object, which is the highest-priority controlled object in the controlled objects, and perform lateral-motion control of the controlled vehicle using the selected controlled object.

The lateral-motion control apparatus according to this embodiment is also configured to determine the priorities of the controlled objects to be used for lateral-motion control of the controlled vehicle according to the application request mode, such as the comfort mode and the safety mode, from at least one selected application. This configuration makes it possible to determine the order of selection of the controlled objects to suit a current condition of the controlled vehicle in which, for example, comfort is more important than responsivity or responsivity is more important than comfort in response to detection of an emergency event.

The lateral-motion control apparatus according to this embodiment is further configured to transfer the controllable range information from the controllable range computer 5 to the control requester 1. This configuration allows each application to generate, based on the controllable range information, a control request such that the control request does not exceed performance limitations to be achieved by lateral-motion control of the controlled vehicle. Thus, it is possible to perform lateral-motion control to suit the controllable range of each of the controlled objects.

Second Embodiment

A lateral-motion control system according to a second embodiment of the present disclosure will be described with reference to FIG. 12. The overall structure and functions of the lateral-motion control system according to the second embodiment are substantially identical to those of the lateral-motion control system according to the first embodiment except for the following points. Therefore, the different points will be mainly described hereinafter.

The lateral-motion control system according to the second embodiment is configured to transfer, to the control requester 1, controllable range information according to the application request mode selected by the driver.

The first limiter 52 of the controllable range computer 5 is adapted to read the application request mode included in the application information supplied from the control requester 1, and perform an application-requested limitation of at least one of the yaw-rate controllable range of the front-wheel steering, the yaw-rate controllable range of the rear-wheel steering, and the yaw-rate controllable range of the braking in accordance with the application request mode.

For example, the first limiter 52 has a map, as an example of data, indicative of the relationship between the variable of at least one of the yaw rate $\gamma$ and the change $d\gamma/dt$ in the yaw rate $\gamma$ for each of the controlled objects and the variable of power consumption required to perform lateral-motion control. In this embodiment, the map is a function of the variable of the change $d\gamma/dt$ in the yaw rate $\gamma$ for each of the controlled objects and the variable of power consumption required to perform lateral-motion control.

Specifically, if the application request mode is set to the eco mode, the first limiter 52 reads the map, and limits at least one of the yaw-rate controllable range of the front-wheel steering, the yaw-rate controllable range of the rear-wheel steering, and the yaw-rate controllable range of the braking based on the map.

Figure 12:
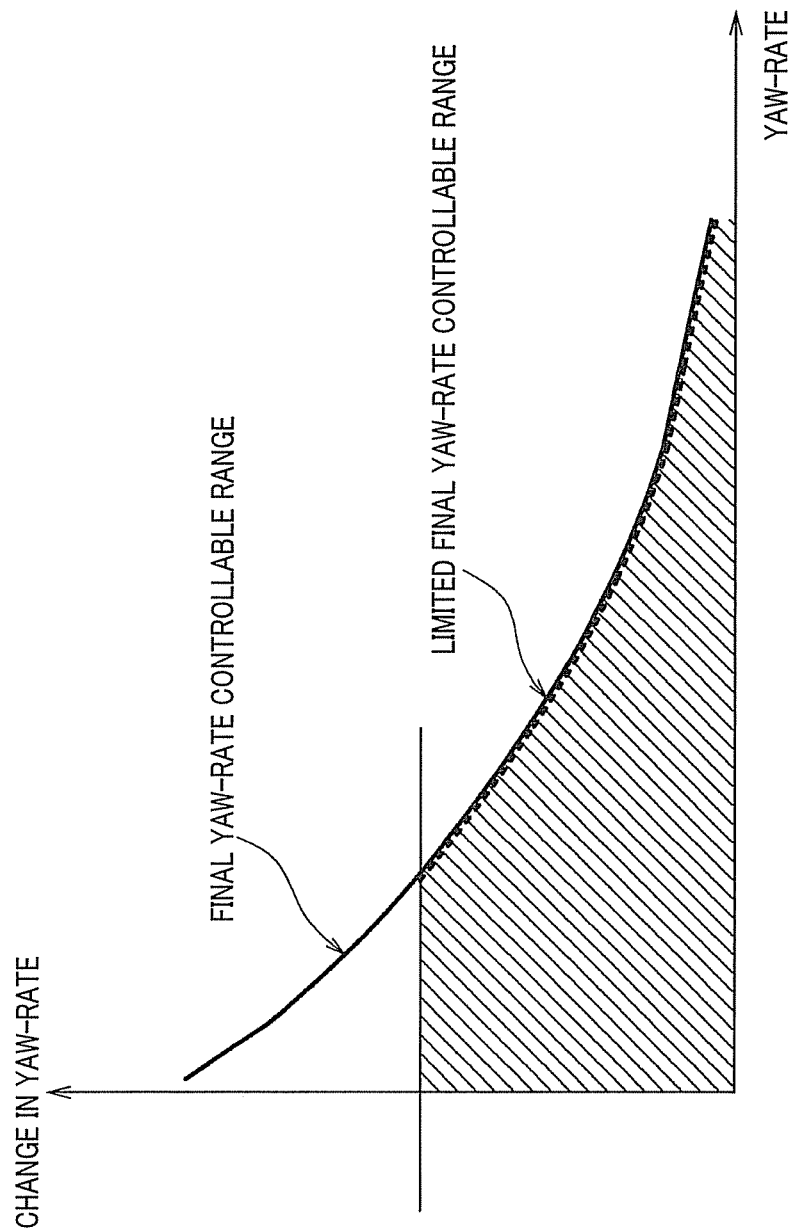
FIG. 12 is a graph schematically illustrating, as a map, a final yaw-rate controllable range for total lateral-motion control of the controlled vehicle according to a second embodiment of the present disclosure.

FIG. 12 schematically illustrates, as a map, the final yaw-rate controllable range for the total lateral-motion control of the controlled vehicle, which has been limited by the first limiter 52 based on the map thereof. As described above, the motor as the EPS ACT 16 is driven by the EPS-ECU 12 in order to adjust the steering angles of the front wheels. Thus, reduction in the angular velocity of the steering angle of each of the front-wheel allows reduction of voltage to be applied to the motor 16, making it possible to reduce power consumption by the motor 16.

That is, the first limiter 52 obtains a first value of the power consumption at the upper limit of the change $d\gamma/dt$ in the yaw rate $\gamma$, and determines a second value of the power consumption at a threshold value of the change $d\gamma/dt$ in the yaw rate $\gamma$ such that the division, as a percentage, of the second value of the power consumption by the first value of the power consumption becomes 10%. The first limiter 52 limits at least one of the yaw-rate controllable range of the front-wheel steering, the yaw-rate controllable range of the rear-wheel steering, and the yaw-rate controllable range of the braking to limit the final yaw-rate controllable range for the total lateral-motion control of the controlled vehicle such that the change $d\gamma/dt$ in the yaw rate $\gamma$ is prevented from exceeding the threshold value.

After the obtainment of the limitation of at least one of the yaw-rate controllable range of the front-wheel steering, the yaw-rate controllable range of the rear-wheel steering, and the yaw-rate controllable range of the braking, the final yaw-rate controllable range for the total lateral-motion control of the controlled vehicle, which has been limited according to the application request mode, is supplied to the control requester 1.

As described above, the lateral motion control system according to the second embodiment is configured to transfer the controllable range information limited according to the application request mode to each application. This configuration allows each application to generate, based on the controllable range information limited according to the application request mode, a control request. For example, if the eco mode is set to the application request mode, the final yaw-rate controllable range for the total lateral-motion control of the controlled vehicle is limited in consideration of reduction in power consumption. Thus, each application is able to generate a control request that reduces power consumption using the limitation of the final yaw-rate controllable range for the total lateral-motion control of the controlled vehicle. Thus, it is possible to perform lateral-motion control to suit the controllable range of at least one of the plurality of controlled objects limited according to the application request mode.

As well as the first embodiment, the controllable range computer 5 according to this embodiment is configured to transfer the total yaw-rate controllable range of all the controlled objects to the control requester 1 in addition to the final yaw-rate controllable range for the total lateral-motion control of the controlled vehicle. This configuration achieves substantially the same advantage as the configuration of the first embodiment does.

Third Embodiment

A lateral-motion control system according to a third embodiment of the present disclosure will be described with reference to FIGS. 13 to 15. The overall structure and functions of the lateral-motion control system according to the third embodiment are substantially identical to those of the lateral-motion control system according to the first embodiment except for the following points. Therefore, the different points will be mainly described hereinafter.

The controllable range computer 5 according to this embodiment is configured to perform controllable-range changing operations according to disturbances.

Figure 13:
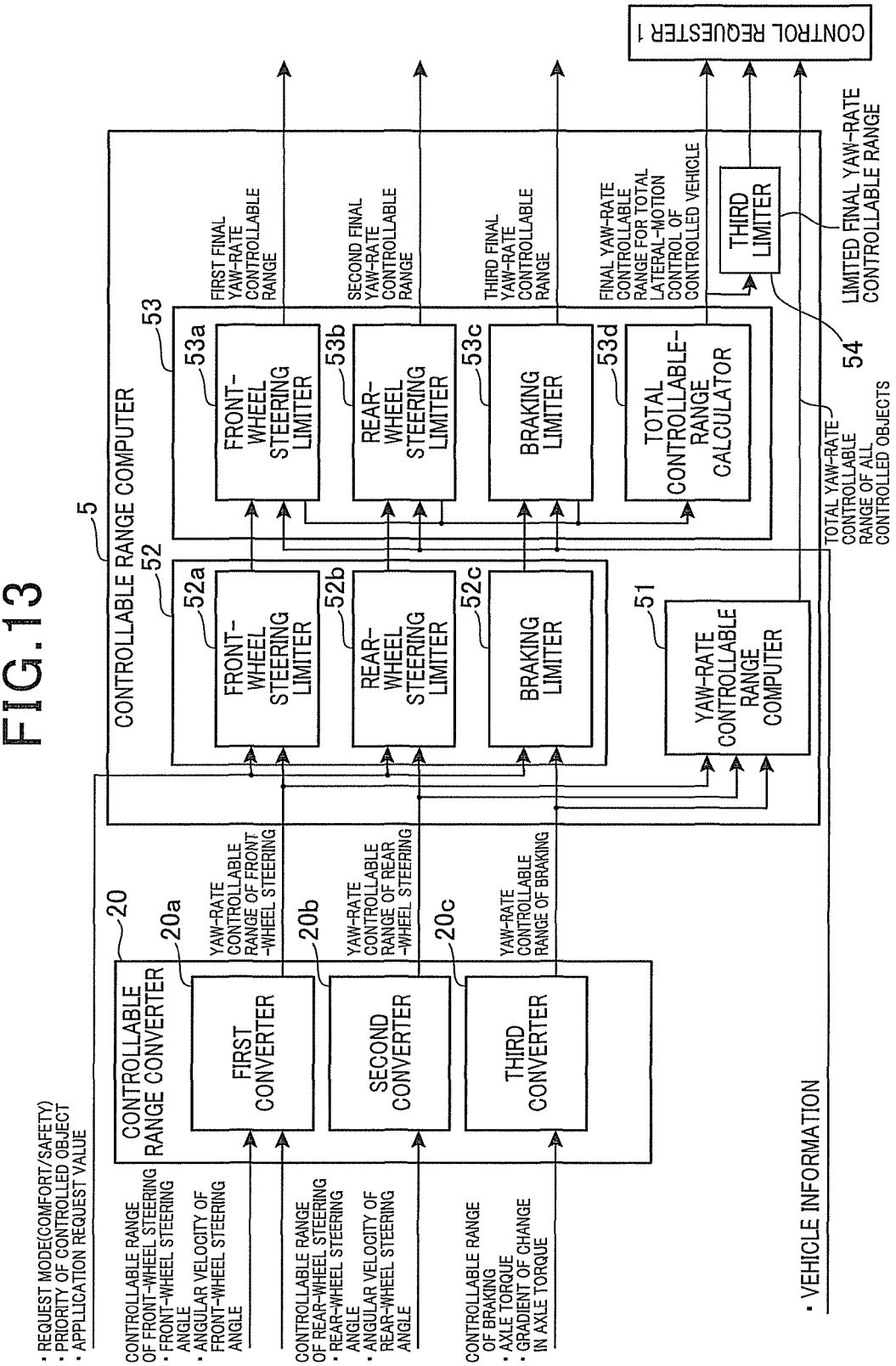
FIG. 13 is a block diagram illustrating the detailed structure of each of a controllable range computer and a controllable range converter illustrated in FIG. 1 according to the second embodiment.

FIG. 13 illustrates the detailed structure of each of a controllable range computer 5A and the controllable range converter 20 illustrated in FIG. 1.

Referring to FIG. 13, the controllable range computer 5A is comprised of a third limiter 54 in addition to the yaw-rate controllable range computer 51, the first limiter 52, and the second limiter 53. The structure and functions of each of the yaw-rate controllable range computer 51, the first limiter 52, and the second limiter 53 according to this embodiment are identical to those of a corresponding one of the yaw-rate controllable range computer 51, the first limiter 52, and the second limiter 53.

The third limiter 54 is adapted to obtain information of one or more disturbances that cause a variable factor of, for example, the final yaw-rate controllable range for total lateral-motion control of the controlled vehicle, and limit the final yaw-rate controllable range for total lateral-motion control of the controlled vehicle based on the disturbance information. Disturbances include a crosswind disturbance and a disturbance due to the cant of the road surface on which the controlled vehicle is running; the cant of the road surface means the slope of a road in a direction crossing the direction of travel of the controlled vehicle.

For example, the third limiter 54 includes a disturbance observer adapted to obtain the information of one or more disturbances. Specifically, disturbance observers are designed to estimate disturbances entering into a system as explicit variations of parameters of at least one component of the system. That is, the disturbance observer of the third limiter 54 is adapted to estimate, based on an explicit variation of at least one parameter of at least one component of the lateral-motion control system, one or more disturbances that cause a variation factor of the final yaw-rate controllable range for total lateral-motion control of the controlled vehicle. On the basis of the estimated one or more disturbances as disturbance information, the third limiter 54 is configured to correct the calculated result of the total controllable-range calculator 53d to limit the final yaw-rate controllable range for total lateral-motion control of the controlled vehicle, thus computing a limited final yaw-rate controllable range for total lateral-motion control of the controlled vehicle in terms of the one or more disturbances.

Figure 14:
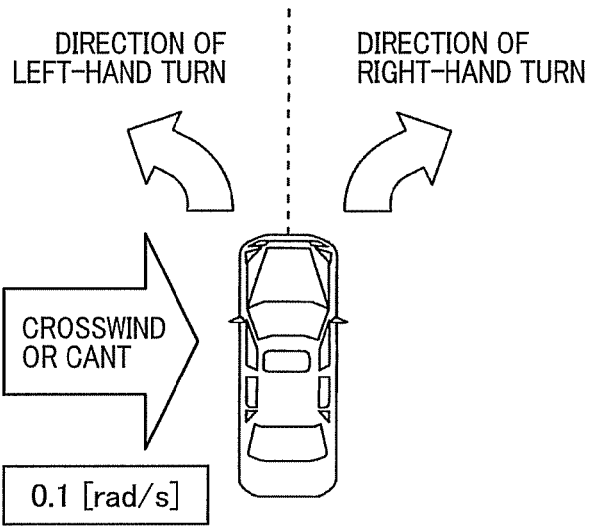
FIG. 14 is a schematic view illustrating the occurrence of a disturbance due to crosswind or the cant of a road surface on which the controlled vehicle is running, the disturbance entering into the lateral motion control system according to a third embodiment of the present disclosure.

FIG. 14 is a schematic view illustrating the occurrence of a disturbance due to crosswind or the cant of the road surface, which enters into the lateral-motion control system installed in the controlled vehicle. As illustrated in FIG. 14, a variation of, for example, 0.1 [rad/s] of the yaw rate occurs in the direction of right-hand turn due to a disturbance of crosswind and/or the cant of the road surface.

If no disturbances contribute to the motion control system, the upper limit of the yaw rate γ of the final yaw-rate controllable range for total lateral-motion control of the controlled vehicle in right-hand turn and the upper limit of the yaw rate γ of the final yaw-rate controllable range for total lateral-motion control of the controlled vehicle in left-hand turn are computed as the same value of, for example, 0.5 [rad/s].

However, as illustrated in FIG. 14, if a variation of, for example, 0.1 [rad/s] of the yaw rate occurs in the direction of right-hand turn due to a disturbance of crosswind and/or the cant of the road surface, the upper limit of the yaw rate γ of the final yaw-rate controllable range for total lateral-motion control of the controlled vehicle in right-hand turn is corrected to be 0.6 [rad/s] by the third limiter 54, and the upper limit of the yaw rate γ of the final yaw-rate controllable range for total lateral-motion control of the controlled vehicle in left-hand turn is corrected to be 0.4 [rad/s]. That is, if a disturbance affects in the direction of turn, a variation of the yaw rate due to the disturbance is added to the final yaw-rate controllable range for total lateral-motion control of the controlled vehicle in the direction of turn. Otherwise, if a disturbance affects in the opposite direction of turn, a variation of the yaw rate due to the disturbance is subtracted from the final yaw-rate controllable range for total lateral-motion control of the controlled vehicle in the opposite direction of turn.

Figure 15:
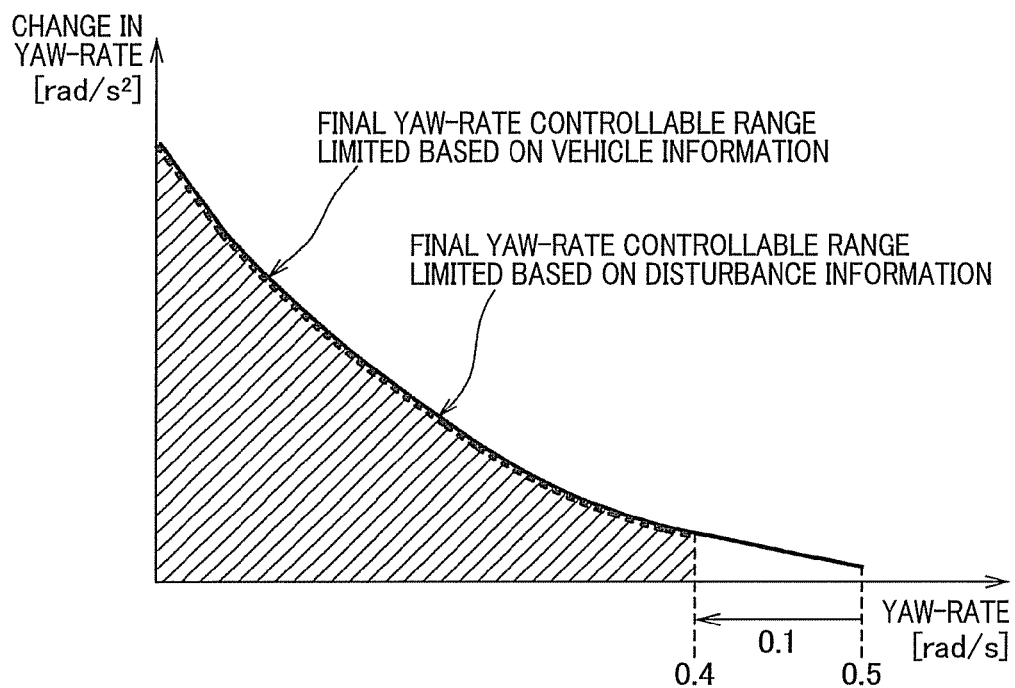
FIG. 15 is a graph schematically illustrating, as maps, a final yaw-rate controllable range for total lateral-motion control of the controlled vehicle in left-hand turn without being corrected based on disturbance information and a final yaw-rate controllable range for total lateral-motion control of the controlled vehicle in left-hand turn corrected based on the disturbance information according to the third embodiment of the present disclosure.

An example of the final yaw-rate controllable range for total lateral-motion control of the controlled vehicle in left-hand turn without being corrected based on the disturbance information and an example of the final yaw-rate controllable range for total lateral-motion control of the controlled vehicle in left-hand turn corrected based on the disturbance information are illustrated respectively as CR1 and CR2 in FIG. 15. That is, the final yaw-rate controllable range CR2 for total lateral-motion control of the controlled vehicle limited by the total controllable-range calculator 53d based on the vehicle information is further limited by the third limiter 54 based on the disturbance information, so that the limited final yaw-rate controllable range CR1 for total lateral-motion control of the controlled vehicle in terms of one or more disturbances is obtained. The limited final yaw-rate controllable range for total lateral-motion control of the controlled vehicle in terms of one or more disturbances is transferred to each application, allowing each application to generate a control request in consideration of one or more disturbances.

As well as the first embodiment, the controllable range computer 5 according to this embodiment is configured to transfer the total yaw-rate controllable range of all the controlled objects to the control requester 1 in addition to the final yaw-rate controllable range for the total lateral-motion control of the controlled vehicle. This configuration achieves substantially the same advantage as the configuration of the first embodiment does.

In each of the first to third embodiments, the lateral-motion control apparatus (system) for performing lateral-motion control of the controlled vehicle has been described as an example of dynamic control of the controlled vehicle, but the present disclosure can be applied to a dynamic control apparatus (system) for performing longitudinal-motion control and/or roll-motion control.

Specifically, the present disclosure can be applied to a dynamic control apparatus (system) provided with a plurality of controlled objects and designed to perform motion control of a controlled vehicle in the same direction using the controlled objects. In this application, the lateral-motion control apparatus is capable of obtaining the controllable range of the at least one control parameter for each of the controlled objects, and determine, based on the controllable range of the at least one control parameter for each of the controlled objects, the priorities of the controlled objects, thus determining a selected controlled object according to the priorities of the controlled objects. Determination of the priorities of the controlled objects according to the controllable range of the at least one control parameter for each of the controlled objects makes it possible to accurately select a controlled object, which is the highest-priority controlled object in the controlled objects, and perform lateral-motion control of the controlled vehicle using the selected controlled object.

For example, as the controlled objects for longitudinal-motion control, braking and drive power (engine output and/or motor output) can be used. As the controlled objects for roll-motion control, suspension and/or output of an active stabilizer can be used. In each of the first to third embodiments, the ACTs 13 to 16 are used to control the controlled objects as an example, but another ACT can be used to control a corresponding one of the controlled objects. For example, in each of the first to third embodiments, control of braking is performed by the ESC-ACT 19, but can be performed by a parking brake ACT, or an actuator for controlling an in-wheel motor installed in each wheel by controlling the torque of each of the front axle and rear axle.

In each of the first to third embodiments, the lateral-motion control apparatus (system) is configured to determine the degree of urgency for lateral-motion control according to, for example, the application request mode, but the present disclosure is not limited to the configuration. Specifically, the lateral-motion control apparatus (system) can be configured to express the degree of urgency for lateral-motion control as a number as, for example, an application request mode. In addition, the controlled object selector 61 can be configured to determine whether the degree of urgency for lateral-motion control is high based on whether the number of the application request mode is equal to or higher than a threshold. Upon determining that the degree of urgency for lateral-motion control is high, the controlled object selector 61 can be configured to select a controlled with a change in a controlled variable being greater than a change in the corresponding controlled variable of another controlled object. Otherwise, upon determining that the degree of urgency for lateral-motion control is not high, the controlled object selector 61 can be configured to select a controlled with the upper limit of a controlled variable being greater than that of another controlled object.

In each of the first to third embodiments, the lateral-motion control apparatus (system) is configured to generate the final yaw-rate controllable range for total lateral-motion control of the controlled vehicle, which has been limited based on both the application information and the vehicle information, but it can be configured to generate a final yaw-rate controllable range for total lateral-motion control of the controlled vehicle, which has been limited based on either the application information or the vehicle information.

For example, the lateral-motion control system according to the third embodiment is configured to limit, based on the disturbance information, the final yaw-rate controllable range for total lateral-motion control of the controlled vehicle limited based on the vehicle information, thus computing a limited final yaw-rate controllable range for total lateral-motion control of the controlled vehicle in terms of the one or more disturbances.

At that time, the lateral-motion control system according to the third embodiment can be modified not to perform a limitation based on the vehicle information. In this modification, the lateral-motion control system can be configured to limit, based on the disturbance information, the sum of the limited yaw-rate controllable ranges of the respective controlled objects outputted from the front-wheel steering limiter 52a, rear-wheel steering limiter 52b, and braking limiter 52c, thus computing a limited final yaw-rate controllable range for total lateral-motion control of the controlled vehicle in terms of the one or more disturbances. Then, the lateral-motion control system can be configured to output, to the control requester 1, the limited final yaw-rate controllable range for total lateral-motion control of the controlled vehicle in terms of the one or more disturbances. This modification substantially achieves the same advantages as the third embodiment.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A vehicle dynamic control apparatus comprising:
   a control requester outputting a request value of a motion parameter associated with a motion of a vehicle in a first direction;
   a controller controlling a plurality of controlled objects based on control parameters of the controlled objects associated with the motion of the vehicle in the first direction to fulfill the request value of the motion parameter;
   a controllable range obtainer obtaining a limited controllable range of each of the control parameters of the controlled objects, and outputting the limited controllable range of each of the control parameters of the controlled objects to the control requester,
   each of the control parameters of the controlled objects including a controlled variable and a change in the controlled variable,
   the controllable range obtainer:
      (i) obtaining, as a first controllable range, the limited controllable range of the controlled variable of each of the controlled objects,
      (ii) obtaining, as a second controllable range, the limited controllable range of the change in the controlled variable of each of the controlled objects, and
      (iii) outputting the first controllable range of the controlled variable of each of the controlled objects and the second controllable range of the change in the controlled variable of each of the controlled objects to the control requester;
   a determiner determining a sequential order of the plurality of controlled objects to be controlled using a relationship between the first controllable range of the controlled variable of each of the controlled objects and the second controllable range of the change in the controlled variable of each of the controlled objects; and
   a selector selecting one of the plurality of controlled objects to be controlled in accordance with the sequential order determined by the determiner,
   wherein the control requester generates the request value of the motion parameter based on the limited controllable range of each of the control parameters of the controlled objects outputted to the control requester from the controllable range obtainer, and
   wherein the control requester includes at least one application outputting, in addition to the motion parameter, a request mode, the request mode of the at least one application representing what the at least one application places a higher priority on, and the determiner determines the sequential order of the plurality of controlled objects to be controlled using the relationship between the first controllable range of the controlled variable of each of the controlled objects and the second controllable range of the change in the controlled variable of each of the controlled objects such that the determined sequential order meets the request mode.

2. The vehicle dynamic control apparatus according to claim 1, wherein the control requester includes at least one application outputting, in addition to the motion parameter, a request mode, the request mode of the at least one application representing what the at least one application places a higher priority on, and the determiner determines the sequential order of the plurality of controlled objects to be controlled using the relationship between the first controllable range of the controlled variable of each of the controlled objects and the second controllable range of the change in the controlled variable of each of the controlled objects such that the determined sequential order meets the request mode.

3. The vehicle dynamic control apparatus according to claim 1, wherein the request value of the motion parameter is associated with a first request value for the controlled variable and a second request value for the change in the controlled variable, the vehicle dynamic control apparatus further comprising:
   a calculator calculating, a value of the controlled variable of each of the controlled objects and a value of the change in the controlled variable of each of the controlled objects relative to one of the first request value for the controlled variable and the second request value for the change in the controlled variable using the relationship between the first controllable range of the controlled variable of each of the controlled objects and the second controllable range of the change in the controlled variable of each of the controlled objects, the one of the first request value for the controlled variable and the second request value for the change in the controlled variable meeting the request mode,
   the determiner determining the sequential order of the plurality of controlled objects to be controlled so as to fulfill the one of the first request value for the controlled variable and the second request value for the change in the controlled variable.

4. The vehicle dynamic control apparatus according to claim 3, wherein the request mode of the at least one application includes a first mode representing that the at least one application places a higher priority on comfort, and a second mode representing that the at least one application places a higher priority on responsivity, and the determiner:
   determines the sequential order of the plurality of controlled objects to be controlled based on whether the value of the controlled variable of each of the controlled objects satisfies the first request value for the controlled variable when the request mode of the at least one application is the first mode; and
   determines the sequential order of the plurality of controlled objects to be controlled based on whether the value of the change in the controlled variable of each of the controlled objects satisfies the second request value for the change in the controlled variable when the request mode of the at least one application is the second mode.

5. The vehicle dynamic control apparatus according to claim 1, wherein the at least one application is programmed to output, in addition to the motion parameter and the request mode, a limitation request to limit the controllable range of the control parameter for at least one of the controlled objects, and the controllable range obtainer:
   limits, based on the limitation request, the controllable range of the control parameter for at least one of the controlled objects to generate the controllable range of the control parameter of each of the controlled objects, the controllable range of the control parameter for the at least one of the controlled objects having been limited; and
   outputs, to the control requester, the controllable range of the control parameter of each of the controlled objects.

6. The vehicle dynamic control apparatus according to claim 5, wherein the controllable range obtainer:
   limits, based on the limitation request, the controllable range of the control parameter of each of the controlled objects to generate a limited controllable range of the control parameter of each of the controlled objects; and
   outputs, to the control requester, the limited controllable range of the control parameter of each of the controlled objects, and the controllable range of the control parameter of each of the controlled objects before being limited.

7. The vehicle dynamic control apparatus according to claim 1, wherein the controllable range obtainer:
   receives vehicle information indicative of current conditions of the vehicle;
   limits, based on the vehicle information, the controllable range of the control parameter of at least one of the controlled objects to generate a limited controllable range of the control parameter of each the at least one of the controlled objects; and
   outputs, to the control requester, the controllable range of the control parameter of the at least one of the controlled objects.

8. The vehicle dynamic control apparatus according to claim 1, wherein the controllable range obtainer:
   obtains a disturbance entering into the vehicle dynamic control apparatus;
   limits, based on the disturbance, the controllable range of the control parameter for at least one of the controlled objects to generate the controllable range of the control parameter of each of the controlled objects, the controllable range of the control parameter for the at least one of the controlled objects having been limited; and
   outputs, to the control requester, the controllable range of the control parameter of each of the controlled objects.

9. The vehicle dynamic control apparatus according to claim 8, wherein the controllable range obtainer:
   limits, based on the limitation request, the controllable range of the control parameter of each of the controlled objects to generate a limited controllable range of the control parameter of each of the controlled objects; and
   outputs, to the control requester, the limited controllable range of the control parameter of each of the controlled objects, and the controllable range of the control parameter of each of the controlled objects before being limited.

10. The vehicle dynamic control according to claim 1, wherein the control requester: generates the request value of the seoend motion parameter based on the controllable range of the control parameter of each of the controlled objects outputted to the control requester from the controllable range obtainer.

11. The vehicle dynamic control apparatus according to claim 10, wherein the control requester includes at least one application:
   determining whether the vehicle is able to avoid an obstacle if the obstacle is detected in front of the vehicle with the vehicle travelling;
   determining whether the vehicle will avoid the obstacle;
   generating the request value of the motion parameter based on the controllable range of the control parameter of each of the controlled objects outputted from the controllable range obtainer if it is determined that the vehicle will avoid the obstacle; and
   stopping the vehicle if it is determined that the vehicle will not avoid the obstacle.

12. A vehicle dynamic control system comprising:
the vehicle dynamic control apparatus recited in claim 1;
the control requester recited in claim 1; and
the plurality of controlled objects recited in claim 1, wherein
the request mode of the at least one application represents a mode representing that the at least one application places a higher priority on ecology, the controllable range obtainer limits, based on the ecology mode as the request mode, the controllable range of each of the control parameters of the controlled objects to generate the limited controllable range of each of the control parameters of the controlled objects, and the control requester generates the request value of the motion parameter based on the limited controllable range of the control parameter of each of the controlled objects outputted to the control requester from the controllable range obtainer.

13. The vehicle dynamic control according to claim 1, wherein the control requester generates the request value of the motion parameter based on the controllable range of the control parameter of each of the controlled objects outputted to the control requester from the controllable range obtainer.

14. The vehicle dynamic control apparatus according to claim 13, wherein the control requester includes at least one application:
determining whether the vehicle is able to avoid an obstacle if the obstacle is detected in front of the vehicle with the vehicle travelling;
determining whether the vehicle will avoid the obstacle;
generating the request value of the motion parameter based on the controllable range of the control parameter of each of the controlled objects outputted from the controllable range obtainer if it is determined that the vehicle will avoid the obstacle; and
stopping the vehicle if it is determined that the vehicle will not avoid the obstacle.

15. The vehicle dynamic control apparatus according to claim 1, wherein the limited controllers range of each of the controlled objects is a range in which each of the controlled objects can be controlled.

16. The vehicle dynamic control apparatus according to claim 1, wherein the controllable range of each of the control parameters of the controlled objects is a range in which each of the controlled objects can be controlled.

* * * * *